United States Patent
Asgedom et al.

(10) Patent No.: US 11,143,772 B2
(45) Date of Patent: Oct. 12, 2021

(54) PROCESSES AND SYSTEMS THAT DEBLEND AND ATTENUATE SOURCE GHOSTS AND SOURCE SIGNATURES IN RECORDED SEISMIC DATA OBTAINED IN A MARINE SURVEY

(71) Applicant: PGS Geophysical AS, Oslo (NO)

(72) Inventors: Endrias Asgedom, Oslo (NO); Walter Söllner, Oslo (NO)

(73) Assignee: PGS Geophysical AS, Oslo (NO)

( * ) Notice: Subject to any disclaimer, the term of this patent is extended or adjusted under 35 U.S.C. 154(b) by 416 days.

(21) Appl. No.: 16/279,629

(22) Filed: Feb. 19, 2019

(65) Prior Publication Data

US 2019/0257965 A1 Aug. 22, 2019

Related U.S. Application Data

(60) Provisional application No. 62/632,773, filed on Feb. 20, 2018.

(51) Int. Cl.
*G01V 1/32* (2006.01)
*G01V 1/34* (2006.01)
*G01V 1/38* (2006.01)

(52) U.S. Cl.
CPC .................. *G01V 1/32* (2013.01); *G01V 1/34* (2013.01); *G01V 1/3808* (2013.01); *G01V 2210/56* (2013.01)

(58) Field of Classification Search
CPC .......... G01V 1/32; G01V 1/3808; G01V 1/34; G01V 2210/56; G01V 2210/1214
See application file for complete search history.

(56) References Cited

U.S. PATENT DOCUMENTS

| 2016/0313465 | A1 | 10/2016 | Söllner | |
| 2019/0257965 | A1* | 8/2019 | Asgedom | G01V 1/32 |
| 2019/0257966 | A1* | 8/2019 | Cecconello | G01V 1/366 |

OTHER PUBLICATIONS

Thorsos, E.I., "The validity of the Kirchoff approximation for rough surface scattering using a Gaussian roughness spectrum," Journal of the Acoustical Society of America, vol. 83, 1987, pp. 78-92.
Fokkema, J.T. et al., "Seismic applications of acoustic reciprocity," Elsevier Science Publishing Company, Inc., 1993, pp. 75-103.
Tsang, L., et al., Electromagnetic waves: Theory and Application, Wiley series in remote sensing, vol. 1, 2000.

* cited by examiner

*Primary Examiner* — Daniel Pihulic

(57) ABSTRACT

Processes and systems for deblending blended seismic data with attenuated source signatures and source ghost are described. Processes and systems compute blended upgoing pressure wavefield based on blended pressure wavefield and blended vertical velocity wavefield recorded in a marine survey of a subterranean formation. Downgoing vertical velocity wavefield is computed based on near-field pressure wavefields generated by source elements of sources activated in the marine survey. Deblended wavefield is computed based on the blended upgoing pressure wavefield and the downgoing vertical velocity source wavefield. The deblended wavefield may be used to generate an image of the subterranean formation with the source signatures and source ghosts contained in the blended pressure wavefield and blended vertical velocity wavefield.

25 Claims, 35 Drawing Sheets

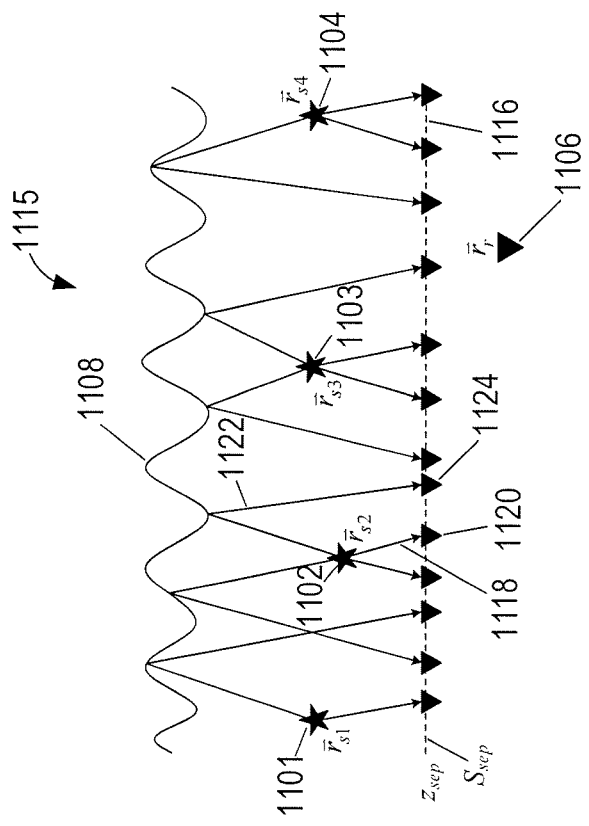
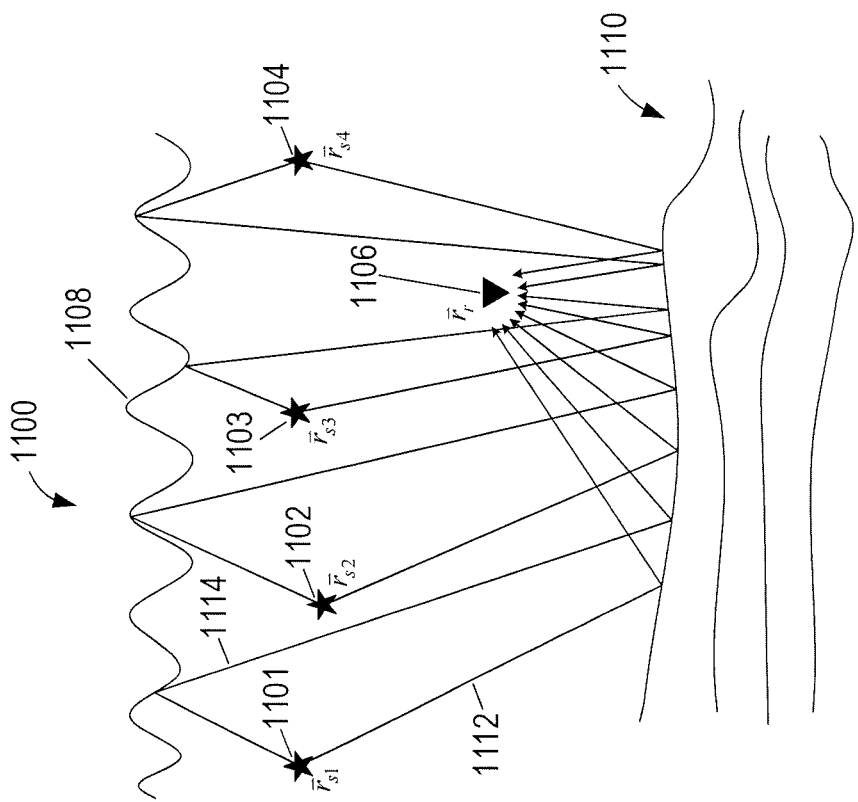
FIG. 11B
FIG. 11A $$\begin{bmatrix} \sum_{i=1}^{N_s} P^-(\omega, \vec{r}_{r1} | \vec{r}_{si}) \\ \sum_{i=1}^{N_s} P^-(\omega, \vec{r}_{r2} | \vec{r}_{si}) \\ \vdots \\ \sum_{i=1}^{N_s} P^-(\omega, \vec{r}_{rN_r} | \vec{r}_{si}) \end{bmatrix} \approx -2i\omega\rho \begin{bmatrix} R_{sub}^{-+}(\omega, \vec{r}_{r1} | \vec{r}_{sep1}) & R_{sub}^{-+}(\omega, \vec{r}_{r1} | \vec{r}_{sep2}) & \cdots & R_{sub}^{-+}(\omega, \vec{r}_{r1} | \vec{r}_{sepN_{sep}}) \\ R_{sub}^{-+}(\omega, \vec{r}_{r2} | \vec{r}_{sep1}) & R_{sub}^{-+}(\omega, \vec{r}_{r2} | \vec{r}_{sep2}) & \cdots & R_{sub}^{-+}(\omega, \vec{r}_{r2} | \vec{r}_{sepN_{sep}}) \\ \vdots & \vdots & & \vdots \\ R_{sub}^{-+}(\omega, \vec{r}_{rN_r} | \vec{r}_{sep1}) & R_{sub}^{-+}(\omega, \vec{r}_{rN_r} | \vec{r}_{sep2}) & \cdots & R_{sub}^{-+}(\omega, \vec{r}_{rN_r} | \vec{r}_{sepN_{sep}}) \end{bmatrix} \begin{bmatrix} \sum_{i=1}^{N_s} V_{s_-}^+(\omega, \vec{r}_{sep1} | \vec{r}_{si}) \\ \sum_{i=1}^{N_s} V_{s_-}^+(\omega, \vec{r}_{sep2} | \vec{r}_{si}) \\ \vdots \\ \sum_{i=1}^{N_s} V_{s_-}^+(\omega, \vec{r}_{sepN_{sep}} | \vec{r}_{si}) \end{bmatrix}$$

$$\begin{bmatrix} C(\omega,\vec{r}_{r1}|\vec{r}_{arb1}) & \cdots & C(\omega,\vec{r}_{r1}|\vec{r}_{arbN_{arb}}) \\ C(\omega,\vec{r}_{r2}|\vec{r}_{arb1}) & \cdots & C(\omega,\vec{r}_{r2}|\vec{r}_{arbN_{arb}}) \\ \vdots & \ddots & \vdots \\ C(\omega,\vec{r}_{rN_r}|\vec{r}_{arb1}) & \cdots & C(\omega,\vec{r}_{rN_r}|\vec{r}_{arbN_{arb}}) \end{bmatrix}_{\nwarrow 1602}$$

$$\approx -2i\omega\rho \begin{bmatrix} R_{sub}^{-+}(\omega,\vec{r}_{r1}|\vec{r}_{sep1}) & \cdots & R_{sub}^{-+}(\omega,\vec{r}_{r1}|\vec{r}_{sepN_{sep}}) \\ R_{sub}^{-+}(\omega,\vec{r}_{r2}|\vec{r}_{sep1}) & \cdots & R_{sub}^{-+}(\omega,\vec{r}_{r2}|\vec{r}_{sepN_{sep}}) \\ \vdots & \ddots & \vdots \\ R_{sub}^{-+}(\omega,\vec{r}_{rN_r}|\vec{r}_{sep1}) & \cdots & R_{sub}^{-+}(\omega,\vec{r}_{rN_r}|\vec{r}_{sepN_{sep}}) \end{bmatrix}_{\nwarrow 1306} \begin{bmatrix} \Gamma(\omega,\vec{r}_{sep1}|\vec{r}_{arb1}) & \cdots & \Gamma(\omega,\vec{r}_{sep1}|\vec{r}_{arbN_{arb}}) \\ \Gamma(\omega,\vec{r}_{sep2}|\vec{r}_{arb1}) & \cdots & \Gamma(\omega,\vec{r}_{sep2}|\vec{r}_{arbN_{arb}}) \\ \vdots & \ddots & \vdots \\ \Gamma(\omega,\vec{r}_{sepN_{sep}}|\vec{r}_{arb1}) & \cdots & \Gamma(\omega,\vec{r}_{sepN_{sep}}|\vec{r}_{arbN_{arb}}) \end{bmatrix}_{\nwarrow 1604}$$

FIG. 16

PROCESSES AND SYSTEMS THAT DEBLEND AND ATTENUATE SOURCE GHOSTS AND SOURCE SIGNATURES IN RECORDED SEISMIC DATA OBTAINED IN A MARINE SURVEY

CROSS-REFERENCE TO A RELATED APPLICATION

This application claims the benefit of Provisional Application 62/632,773, filed Feb. 20, 2018, which application is hereby incorporated by reference entirely as if fully set forth herein.

BACKGROUND

Marine seismology companies invest heavily in the development of marine seismic surveying equipment and seismic data processing techniques in order to obtain accurate, high-resolution images of subterranean formations located beneath a body of water. High-resolution images of a subterranean formation are used to determine the structure of subterranean formations, discover petroleum reservoirs, and monitor petroleum reservoirs during production. A typical marine seismic survey is performed with one or more survey vessels that tow a seismic source and many streamers through the body of water. The survey vessel contains seismic acquisition equipment, such as navigation control, seismic source control, seismic receiver control, and recording equipment. The seismic source control controls activation of the one or more seismic sources at selected times or locations. The seismic source can be an impulsive source, such as an array of air guns, that are activated to produce acoustic energy with an impulsive signature. The seismic source can be a marine vibrator that emits acoustic energy with a substantially constant signature over a much longer time period. The acoustic energy generated by a seismic source spreads out in all directions. A portion of the acoustic energy travels down through the water and into a subterranean formation to propagate as sound waves within the subterranean formation. At each interface between different types of liquid, rock and sediment, a portion of the sound wave is refracted, a portion is transmitted, and another portion is reflected into the body of water to propagate as a reflected wavefield toward the water surface. The streamers are elongated spaced apart cable-like structures towed behind a survey vessel in the direction the survey vessel is traveling and are typically arranged substantially parallel to one another. Each streamer contains many seismic receivers or sensors that detect pressure and/or particle motion wavefields of the sound waves. The streamers collectively form a seismic data acquisition surface that records wavefields as seismic data in the recording equipment. The recorded pressure and/or particle motion wavefields are processed to generate images of the subterranean formation.

DESCRIPTION OF THE DRAWINGS

FIG. 11A shows example ray paths of blended upgoing pressure wavefields that reach a receiver in the space-time domain.

FIG. 11B shows example ray paths of downgoing vertical velocity source wavefields that reach locations along the separation level in the space-time domain.

FIG. 13 shows a matrix representation of a system of equations that relate blended upgoing wavefields to a product of deblended wavefield with attenuated source signatures and source ghosts and downgoing vertical velocity source wavefields.

FIG. 16 shows a matrix representation of a systems of equations that related a correlation wavefield matrix to a product of deblended wavefield with attenuated source signatures and source ghosts and a point spread function matrix.

DETAILED DESCRIPTION

In a traditional marine survey, seismic data is recorded in separate shot records. Each shot record is obtained by activating a source followed by recording reflected wavefields in a recording time interval of about 8-12 seconds. In recent years, continuous recording and simultaneous source acquisition ("SSA") techniques have emerged as alternative ways to record seismic data in a marine survey. With continuous recording, sources, or different combinations of source elements of the same source, are activated in the water above a subterranean formation with randomized activation times and at generalized locations while overlapping reflected wavefields are continuously recorded as blended seismic data. With SSA, multiple sources are activated in the body of water above the subterranean formation in activation time intervals (e.g., about 1-3 seconds) to create multiple overlapping reflected wavefields that are recorded as blended seismic data in a shot record following the activation time interval. SSA increases acoustic illumination of the subterranean formation and diversity of the recorded seismic data in teens of fold, azimuth, and offsets over traditional single source activation and can improve the efficiency of data acquisition due to shorter time interval between source activations relative to those in traditional surveys.

The blended seismic data obtained with continuous recording or SSA contains a record of the overlapping reflected wavefields and nonessential source wavefields. The source wavefields include source signatures that correspond to a portion of each source wavefield that travels directly to the receivers and source ghosts created by source wavefields reflected downward from the free surface before reaching the receivers. The source wavefields are regarded as noise, because source signatures and source ghosts contain no information about the subterranean formation. Processes and systems described herein are directed to deblending blended seismic data to form gathers of deblended wavefield with attenuated source signatures and source ghosts. Each gather of deblended wavefield with attenuated source signatures and source ghosts may be further processed to generate high-resolution images of a subterranean formation.

Marine Seismic Surveying

Figure 1A:
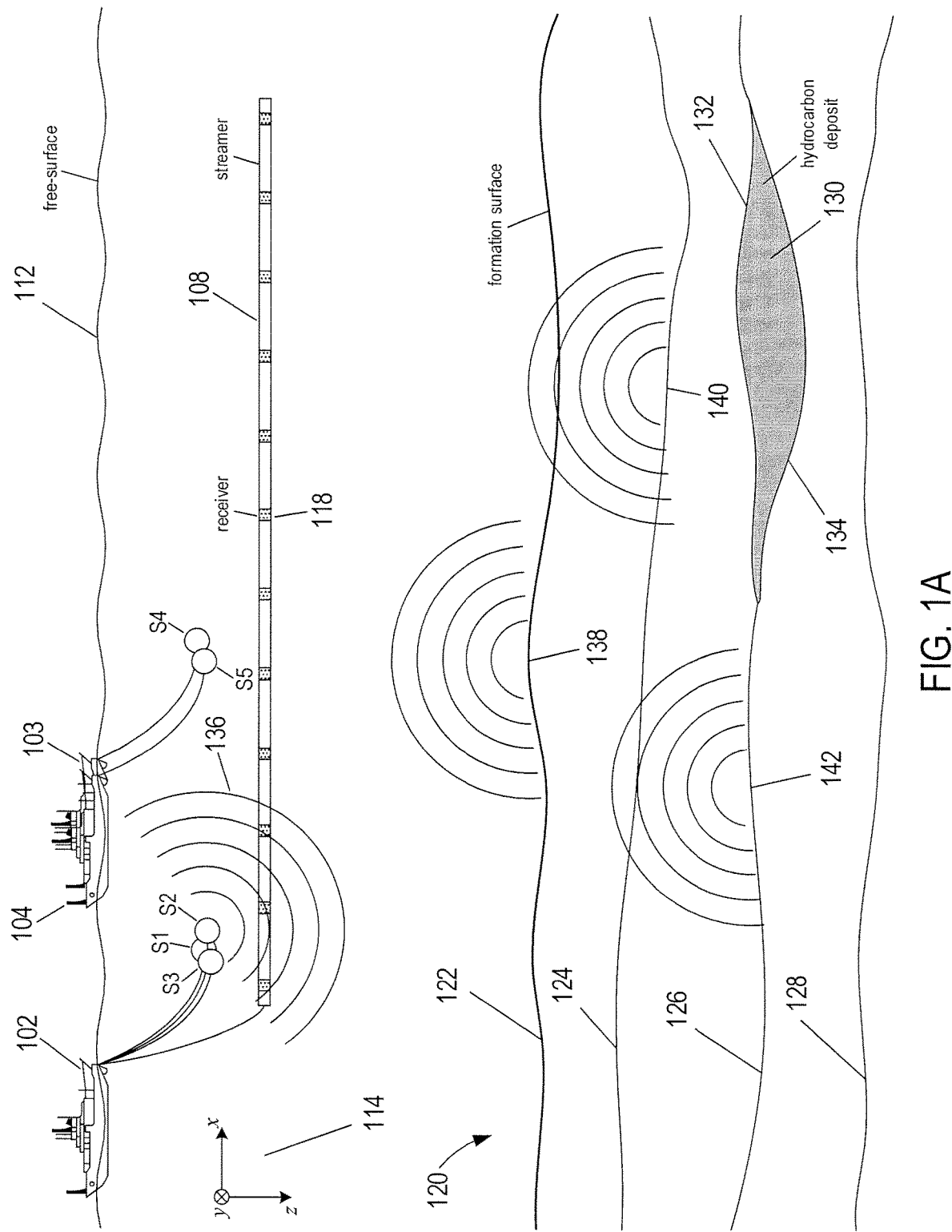
FIGS. 1A-1B show side-elevation and top views of an example seismic data acquisition system.
Figure 1B:
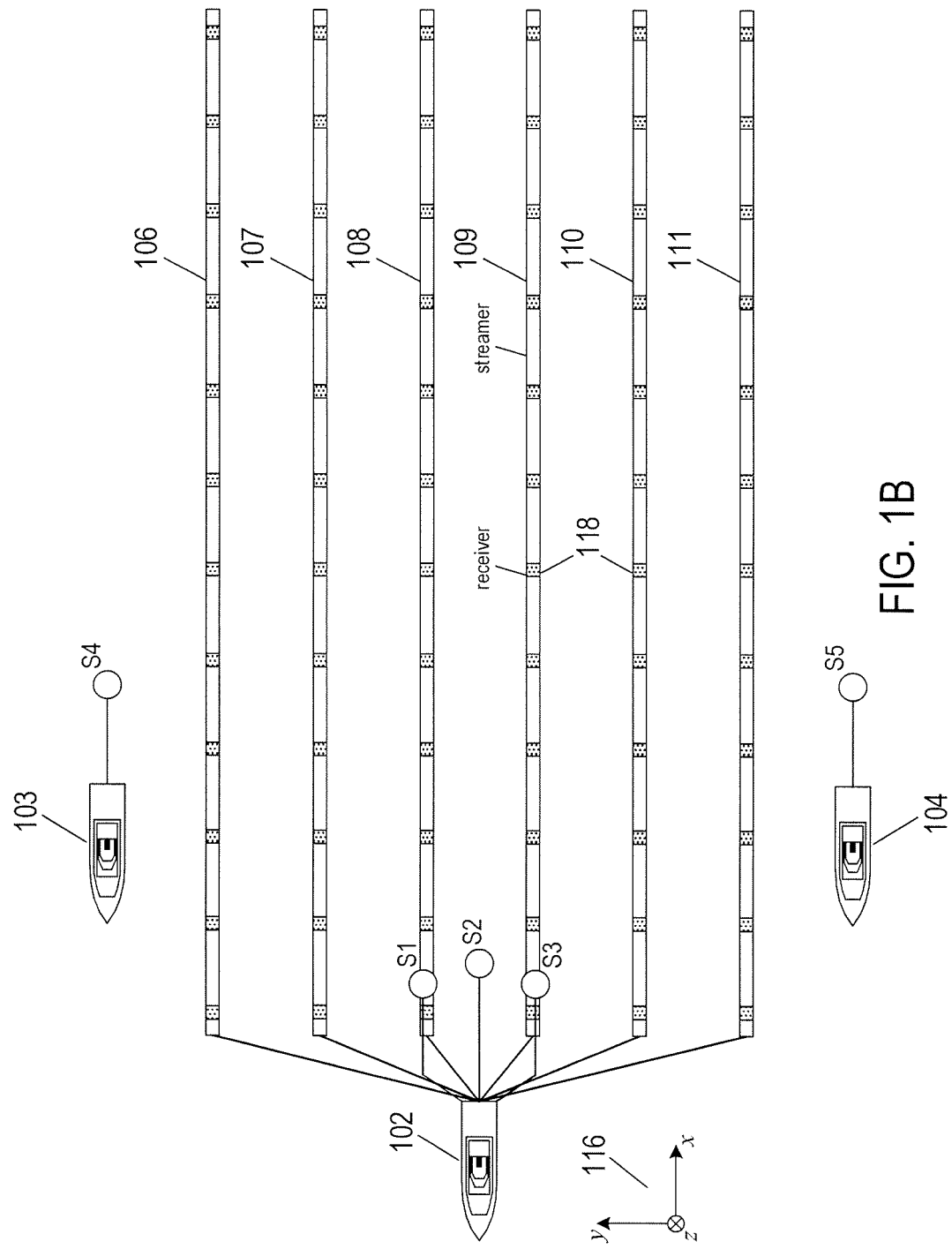

FIGS. 1A-1B show a side-elevation view and a top view, respectively, of an example marine seismic data acquisition system composed of three exploration seismology survey vessels 102-104 and five sources denoted by S1, S2, S3, S4, and S5. As illustrated, a survey vessel 102 tows sources S1, S2, and S3, a survey vessel 103 tows source S4, and a survey vessel 104 tows source S5. A seismic data acquisition system is not limited to five sources as shown in FIGS. 1A-1B. In practice, the number of sources can range from as few as a single source towed by a survey vessel to as many as six or more sources towed by different survey vessels. The body of water can be, for example, an ocean, a sea, a lake, a river, or any portion thereof. In this example, the survey vessel 102 tows six streamers 106-111 below the free surface of a body of water. Each streamer is attached at one end to the survey vessel 102 via a streamer-data-transmission cable. The illustrated streamers 106-111 form an ideally planar horizontal seismic data acquisition surface of the marine seismic data acquisition system with respect to the free surface 112. However, in practice, the streamers may be smoothly varying due to active sea currents and weather conditions. In other words, although the streamers 106-111 are illustrated in FIGS. 1A and 1B to form a planar data acquisition surface, in practice, the towed streamers may undulate because of dynamic conditions of the body of water in which the streamers are submerged. A data acquisition surface is not limited to a planar horizontal orientation with respect to the free surface 112. The data acquisition surface may be angled with respect to the free surface 112 or one or more of the streamers may be towed at different depths. A data acquisition surface is not limited to six streamers as shown in FIG. 1B. In practice, the number of streamers used to form a data acquisition surface can range from as few as one streamer to as many as 20 or more streamers.

FIG. 1A includes an xz-plane 114, and FIG. 1B includes an xy-plane 116, of the same Cartesian coordinate system having three orthogonal, spatial coordinate axes labeled x, y and z. The coordinate system specifies orientations and coordinate locations within the body of water. The x-direction specifies the position of a point in a direction parallel to the length of the streamers or in the direction the survey vessel is traveling and is referred to as the "in-line" direction. The y-direction specifies the position of a point in a direction perpendicular to the x-axis and substantially parallel to the free surface 112 and is referred to as the "cross-line" direction. The z-direction, also referred to as the "depth" direction, specifies the position of a point perpendicular to the xy-plane (i.e., perpendicular to the free surface 112) with the positive z-direction pointing downward away from the free surface 112. The streamers 106-111 are long cables containing power and data-transmission lines that connect receivers represented by shaded rectangles, such as receiver 118, spaced-apart along the length of each streamer to seismic data acquisition equipment, computers, and data-storage devices located onboard the survey vessel 102.

Streamer depth below the free surface 112 can be estimated at various locations along the streamers using depth-measuring devices attached to the streamers. For example, the depth-measuring devices can measure hydrostatic pressure or utilize acoustic distance measurements. The depth-measuring devices can be integrated with depth controllers, such as paravanes or water kites that control and maintain the depth and position of the streamers as the streamers are towed through the body of water. The depth-measuring devices are typically placed at intervals (e.g., about 300-meter intervals in some implementations) along each streamer. Note that in other implementations buoys may be attached to the streamers and used to maintain the orientation and depth of the streamers below the free surface 112.

Figure 2:
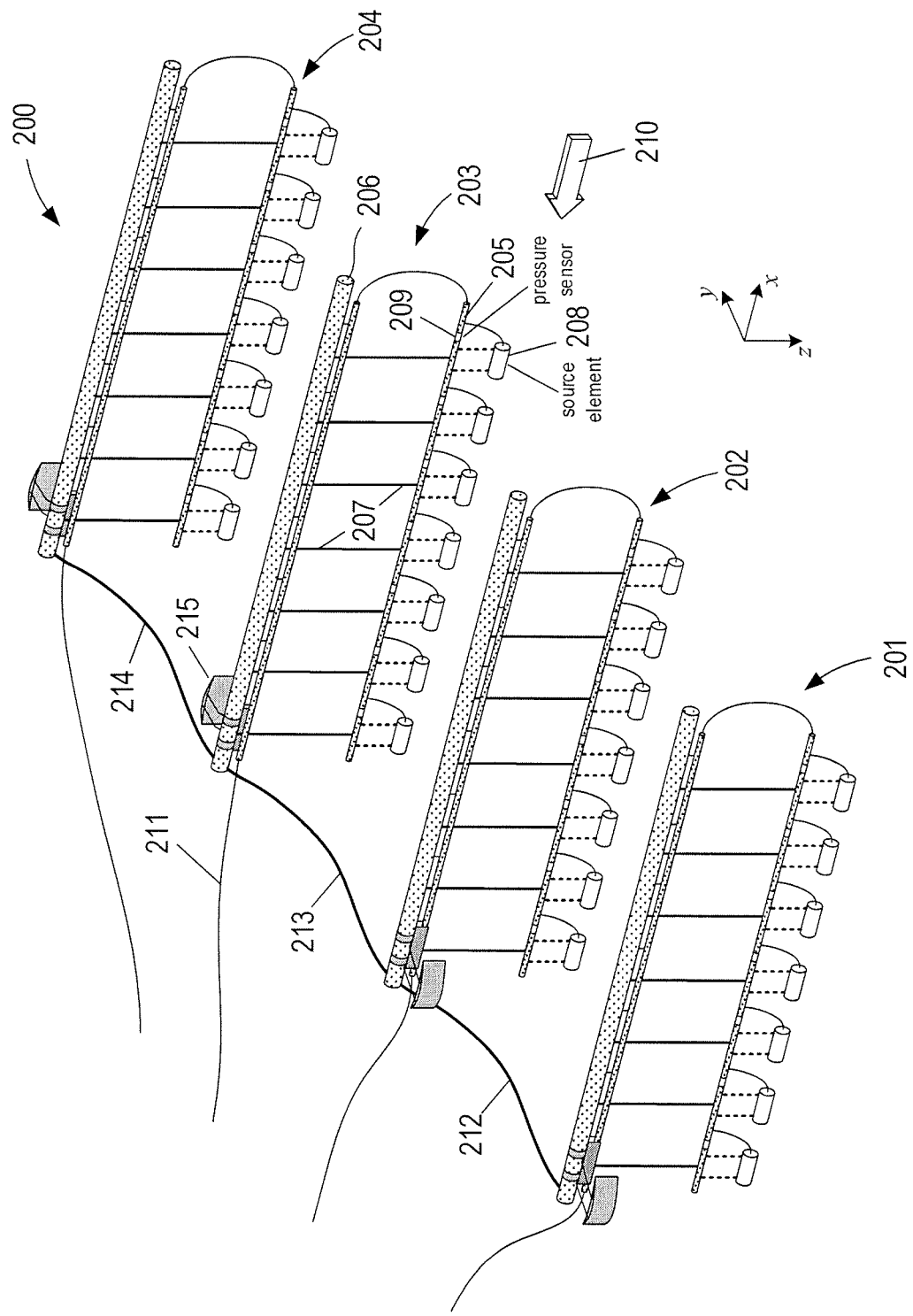
FIG. 2 shows an isometric view of an example source.

FIG. 1A shows a side-elevation view of the survey vessels 102-104 towing sources S1-S5 above a subterranean formation 120. Each of the sources S1-S5 comprises multiple sources elements, such as water guns or air guns, suspended from floats below the free surface. FIG. 2 shows an isometric view of an example source 200 composed of four sub-arrays 201-204, each having a plurality of source elements 208 suspended from a float. The sub-arrays 201-204 have the same components. For example, sub-array 203 includes a semi-rigid rod 205 suspended from a float 206 by depth ropes 207. Seven source elements, such as source element 208, are suspended from the semi-rigid rod 205. Examples of source elements include air guns or water guns. The air guns and water guns may be selected with different chamber volumes and arranged in a particular manner within the source to generate an acoustic impulse. For example, each source may comprise an array of source elements that are activated to produce an acoustic signal with an impulse (i.e., spike) source signature. The sub-array 203 also includes seven pressure sensors, such as pressure sensor 209, spaced apart along the semi-rigid rod 205. Each pressure sensor is located along the semi-rigid rod 205 approximately 1 m from a source element to measure a pressure disturbance created by the source element as the source 200 moves in the direction represented by directional arrow 210. Each sub-array is connected to a cable, such as cable 211, that includes electrical wires that transmit electrical activation signals to each source element and transmit electrical signals generated by each pressure sensor back to the survey vessel and may include an air hose that carries compressed air from the survey vessel to each source element. The sub-arrays 201-204 are connected by cables 212-214, and each sub-array includes a steering device, such as a wing 215, that may be used to separately steer and control the direction the sub-array travels while being towed through the body of water. Note that sources are not intended to be limited to the example twenty-eight source elements shown in FIG. 2. For example, a source may have as many as 80 or more source elements.

Returning to FIG. 1A, curve 122, the formation surface, represents a top surface of the subterranean formation 120 located at the bottom of the body of water. The subterranean formation 120 may include many subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, the depth and positional coordinates of which may be determined, at least in part, by analysis of seismic data collected during a marine seismic survey. As the survey vessel 102 moves over the subterranean formation 120, the sources S1-S5 are activated (i.e., fired or shot) to produce corresponding acoustic signals. For the sake of simplicity, FIG. 1A shows a single acoustic signal expanding outward from the source S2 as a pressure wavefield 136 represented by semicircles of increasing radius centered at the source S2. The outwardly expanding wavefronts from the source may be spherical but are shown in vertical plane cross section in FIG. 1A. The outward and downward expanding portion of the pressure wavefield 136 is called the "source wavefield," and any portion of the pressure wavefield 136 reflected downward from the free-surface 112 is called the "ghost source wavefield." The source and ghost source wavefields eventually reach the formation surface 122 of the subterranean formation 120, at which point the wavefields may be partially reflected from the formation surface 122 and partially refracted downward into the subterranean formation 120, becoming elastic waves within the subterranean formation 120. In other words, in the body of water, the acoustic signal primarily comprises compressional pressure waves, or P-waves, while in the subterranean formation 120, the waves include both P-waves and transverse waves, or S-waves. Within the subterranean formation 120, at each interface between different types of materials or at discontinuities in density or in one or more of various other physical characteristics or parameters, downward propagating waves may be partially reflected and partially refracted. As a result, each point of the formation surface 122 and each point of the interfaces 124, 126, and 128 may be a reflector that becomes a potential secondary point source from which acoustic and elastic wave energy, respectively, may emanate upward toward the receivers 118 in response to the acoustic signals generated by the sources S1-S5. As shown in FIG. 1A, waves of significant amplitude may be generally reflected from points on or close to the formation surface 122, such as point 138, and from points on or very close to interfaces in the subterranean formation 120, such as points 140 and 142.

The waves that compose the reflected wavefield may be generally reflected at different times within a range of times following the source wavefield. A point on the formation surface 122, such as the point 138, may receive a pressure disturbance from the source wavefield more quickly than a point within the subterranean formation 120, such as points 140 and 142. Similarly, a point on the formation surface 122 directly beneath the source 104 may receive the pressure disturbance sooner than a more distant-lying point on the formation surface 122. Thus, the times at which waves are reflected from various points within the subterranean formation 120 may be related to the distance, in three-dimensional space, of the points from the activated source.

Acoustic and elastic waves may travel at different velocities within different materials as well as within the same material under different pressures. Therefore, the travel times of the source wavefield and reflected wavefield may be functions of distance from the source as well as the materials and physical characteristics of the materials through which the wavefields travel. In addition, expanding wavefronts of the wavefields may be altered as the wavefronts cross interfaces and as the velocity of sound varies in the media traversed by the wavefront. The superposition of waves reflected from within the subterranean formation 120 in response to the source wavefield may be a generally complicated wavefield that includes information about the shapes, sizes, and material characteristics of the subterranean formation 120, including information about the shapes, sizes, and locations of the various reflecting features within the subterranean formation 120 of interest to exploration seismologists.

Figure 3:
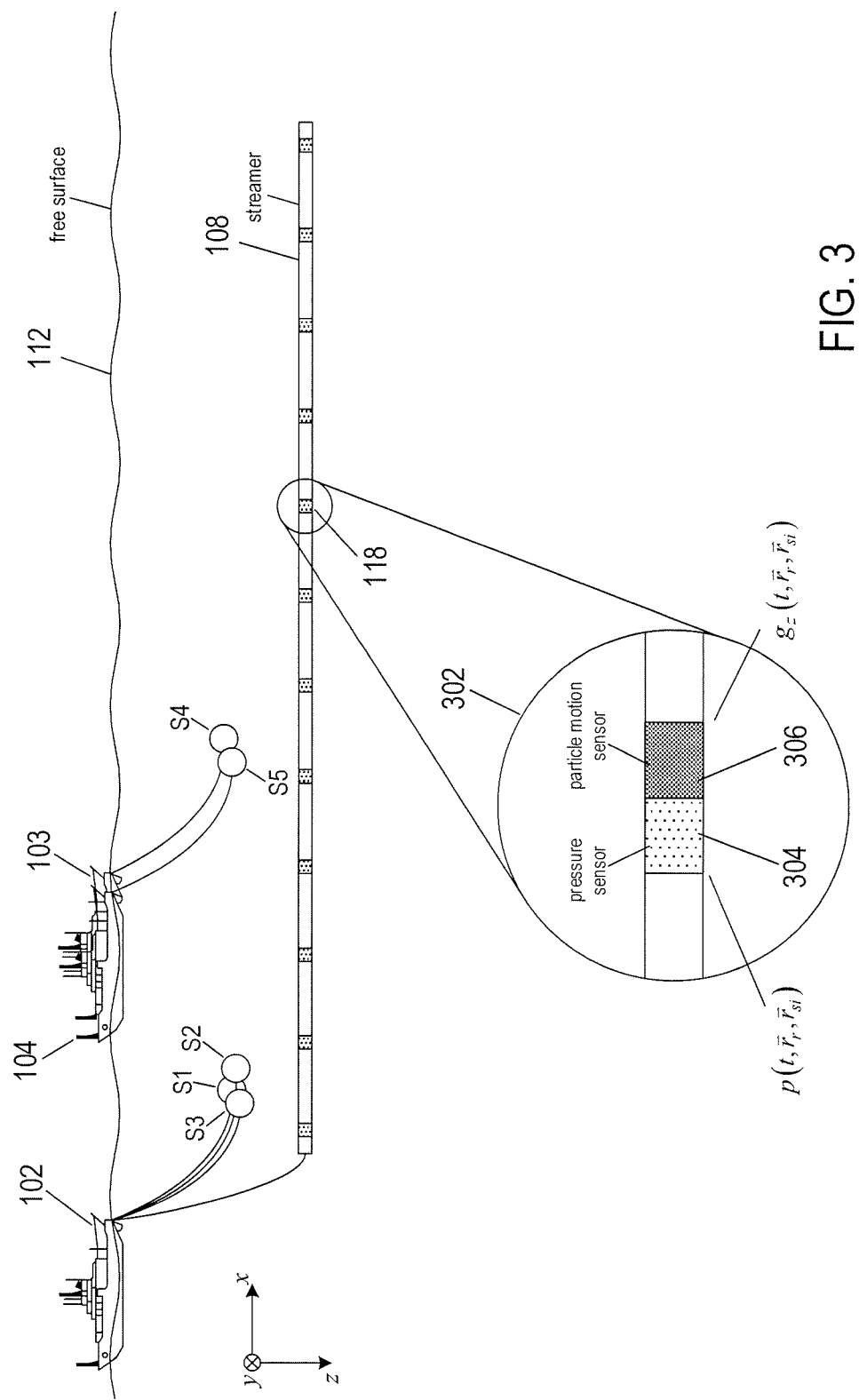
FIG. 3 shows a side-elevation view of a seismic data acquisition system with a magnified view of a receiver.

Each receiver 118 may be a multicomponent sensor including particle motion sensors and a pressure sensor. A pressure sensor detects variations in water pressure over time. The term "particle motion sensor" is a general term used to refer to a sensor that may be configured to detect particle displacement, particle velocity, or particle acceleration over time. FIG. 3 shows a side-elevation view of the marine seismic data acquisition system with a magnified view 302 of the receiver 118. In this example, the magnified view 302 reveals that the receiver 118 is a multicomponent sensor comprising a pressure sensor 304 and a particle motion sensor 306. The pressure sensor may be, for example, a hydrophone. Each pressure sensor is a non-directional sensor that measures changes in a hydrostatic pressure wavefield over time to produce pressure wavefield data denoted by $p(\vec{r}_r, \vec{r}_{si}, t)$, where $\vec{r}_r$ represents the Cartesian coordinates $(x_r, y_r, z_r)$ of a receiver, $\vec{r}_{si}$ represents the Cartesian coordinates $(x_{si}, y_{si}, z_{si})$ of $N_s$ sources with source subscript $i=1, \ldots, N_s$ (e.g., $N_s=5$ in FIGS. 1A, 1B, and 3), and t represents time. Pressure wavefield data may also be called the "pressure wavefield." The particle motion sensors are directional sensors that are responsive to water motion in a particular direction. In general, particle motion sensors detect particle motion (i.e., displacement, velocity, or acceleration) in a direction and may be responsive to such directional displacement of the particles, velocity of the particles, or acceleration of the particles. A particle motion sensor that measures particle displacement generates particle displacement data denoted by $g\vec{n}(\vec{r}_r, \vec{r}_{si}, t)$, where the vector $\vec{n}$ represents the direction along which particle displacement is measured. A particle motion sensor that measures particle velocity (i.e., particle velocity sensor) generates particle velocity wavefield data denoted by $v\vec{n}(\vec{r}_r, \vec{r}_{si}, t)$. A particle motion sensor that measures particle acceleration (i.e., accelerometer) generates particle acceleration data denoted by $a\vec{n}(\vec{r}_r, \vec{r}_{si}, t)$. The data generated by one type of particle motion sensor may be converted to another type. For example, particle displacement data may be differentiated to obtain particle velocity wavefield data, and particle acceleration data may be integrated to obtain particle velocity wavefield data.

The teen "particle motion data" is a general teen used to refer to particle displacement data, particle velocity wavefield data, or particle acceleration data. The term "seismic data" refers to pressure wavefield data and/or particle motion data. Particle displacement data represents a particle displacement wavefield, particle velocity wavefield data represents a particle velocity wavefield, and particle acceleration data represents a particle acceleration wavefield. The particle displacement, velocity, and acceleration wavefield data are correspondingly called particle displacement, velocity, and acceleration wavefields.

The particle motion sensors are typically oriented so that the particle motion is measured in the vertical direction (i.e., $\vec{n} = (0,0,z)$) in which case $g_z(\vec{r}_r, \vec{r}_{si}, t)$ is called vertical wavefield displacement data, $vz(\vec{r}_r, \vec{r}_{si}, t)$ is called vertical velocity wavefield, and $a_z(\vec{r}_r, \vec{r}_{si}, t)$ is called vertical acceleration wavefield. Alternatively, each receiver may include two additional particle motion sensors that measure particle motion in two other directions, $\vec{n}_1$ and $\vec{n}_2$ that are orthogonal to $\vec{n}$ (i.e., $\vec{n} \cdot \vec{n}_1 = \vec{n} \cdot \vec{n}_2 = 0$, where "·" is the scalar product) and orthogonal to one another (i.e., $\vec{n}_1 \cdot \vec{n}_2 = 0$). In other words, each receiver may include three particle motion sensors that measure particle motion in three orthogonal directions. For example, in addition to having a particle motion sensor that measures particle velocity in the z-direction to give $v_z(\vec{r}_r, \vec{r}_{si}, t)$, each receiver may include a particle motion sensor that measures the wavefield in the in-line direction in order to obtain the in-line velocity wavefield, $v_x(\vec{r}_r, \vec{r}_{si}, t)$, and a particle motion sensor that measures the wavefield in the cross-line direction in order to obtain the cross-line velocity wavefield, $v_y(\vec{r}_r, \vec{r}_{si}, t)$. In certain implementations, the receivers may be only pressure sensors, and in other implementations, the receivers may be only particle motion sensors. The three orthogonal velocity wavefield sets form a velocity wavefield vector $\vec{x} = (v_x, v_y, v_z)$.

The streamers 106-111 and the survey vessel 102 may include sensing electronics and data-processing facilities that allow seismic data generated by each receiver to be correlated with the time each source is activated, absolute positions on the free surface 112, and absolute three-dimensional positions with respect to an arbitrary three-dimensional coordinate system. The pressure wavefield and particle motion wavefield may be stored at the receiver, and/or may be sent along the streamers and data transmission cables to the survey vessel 102, where the data may be stored electronically, magnetically, or optically on data-storage devices located onboard the survey vessel 102 and/or transmitted onshore to data-storage devices located is a seismic data-processing facility.

Each pressure sensor and particle motion sensor may include an analog-to-digital converter that converts time-dependent analog signals into discrete time series that consist of a number of consecutively measured values called "amplitudes" separated in time by a sample rate. The time series data generated by a pressure or particle motion sensor is called a "trace," which may consist of thousands of samples collected at a typical sample rate of about 1 to 5 samples per millisecond. A trace is a recording of a subterranean formation response to acoustic energy that passes from an activated source, into the subterranean formation where a portion of the acoustic energy is reflected and/or refracted, and ultimately detected by a sensor as described above. Each trace records variations in time-dependent amplitudes that correspond to fluctuations in acoustic energy of the wavefield measured by the sensor. In general, each trace is an ordered set of discrete spatial and time-dependent pressure or motion sensor amplitudes denoted by:

$$tr(\vec{r}_r, \vec{r}_{si}, t) = \{A(\vec{r}_r, \vec{r}_{si}, t)\}_{j=0}^{J-1} \quad (1)$$

where tr represents pressure, particle displacement, particle velocity, or particle acceleration amplitude;

A represents amplitude;

$t_j$ is the j-th sample time; and

J is the number of time samples in the trace.

The coordinate location $\vec{x}_r$ of each receiver may be calculated from global position information obtained from one or more global positioning devices located along the streamers and/or the towing vessel, from depth measuring devices, such as hydrostatic pressure sensors, and the known geometry and arrangement of the streamers and receivers. The receiver and source locations varies with time and may also be denoted by $\vec{x}_r = \vec{x}_r(t) = (x_r(t), y_r(t), z_r(t))$ and $\vec{x}_{si} = \vec{x}_{si}(t) = (x_{si}(t), y_{si}(t), z_{si}(t))$. Each trace also includes a trace header not represented in Equation (1) that identifies the specific receiver that generated the trace, receiver and source GPS spatial coordinates, receiver depth, and may include time sample rate and the number of time samples.

Reflected wavefields from the subterranean formation typically arrive first at the receivers located closest to the sources. The distance from the sources to a receiver is called the "source-receiver offset," or simply "offset." A larger offset generally results in a longer arrival time delay. The traces are collected to form a "gather" that can be further processed using various seismic data processing techniques to obtain information about the structure of the subterranean formation. The traces may be sorted into different domains, such as a common-shot domain, common-receiver domain, common-receiver-station domain, and common-midpoint domain. For example, a collection of traces sorted into the common-shot domain are called a common-shot gather and a collection of traces sorted into common-receiver domain are called a common-receiver gather. The portion of the acoustic signal that is reflected into the body of water from the subterranean formation and travels directly to the receivers is called a primary reflected wavefield or simply a "primary." Other portions of the acoustic energy that are reflected upward into the body of water and that reverberate between the free surface and the subterranean formation before reaching the receivers are called free-surface multiple reflected wavefields or simply "free-surface multiples." Other portions of the acoustic energy that are reflected upward into the body of water directly to receivers after having reverberated within the subterranean formation are called subsurface multiple reflections or simply "subsurface multiples."

Figure 4A:
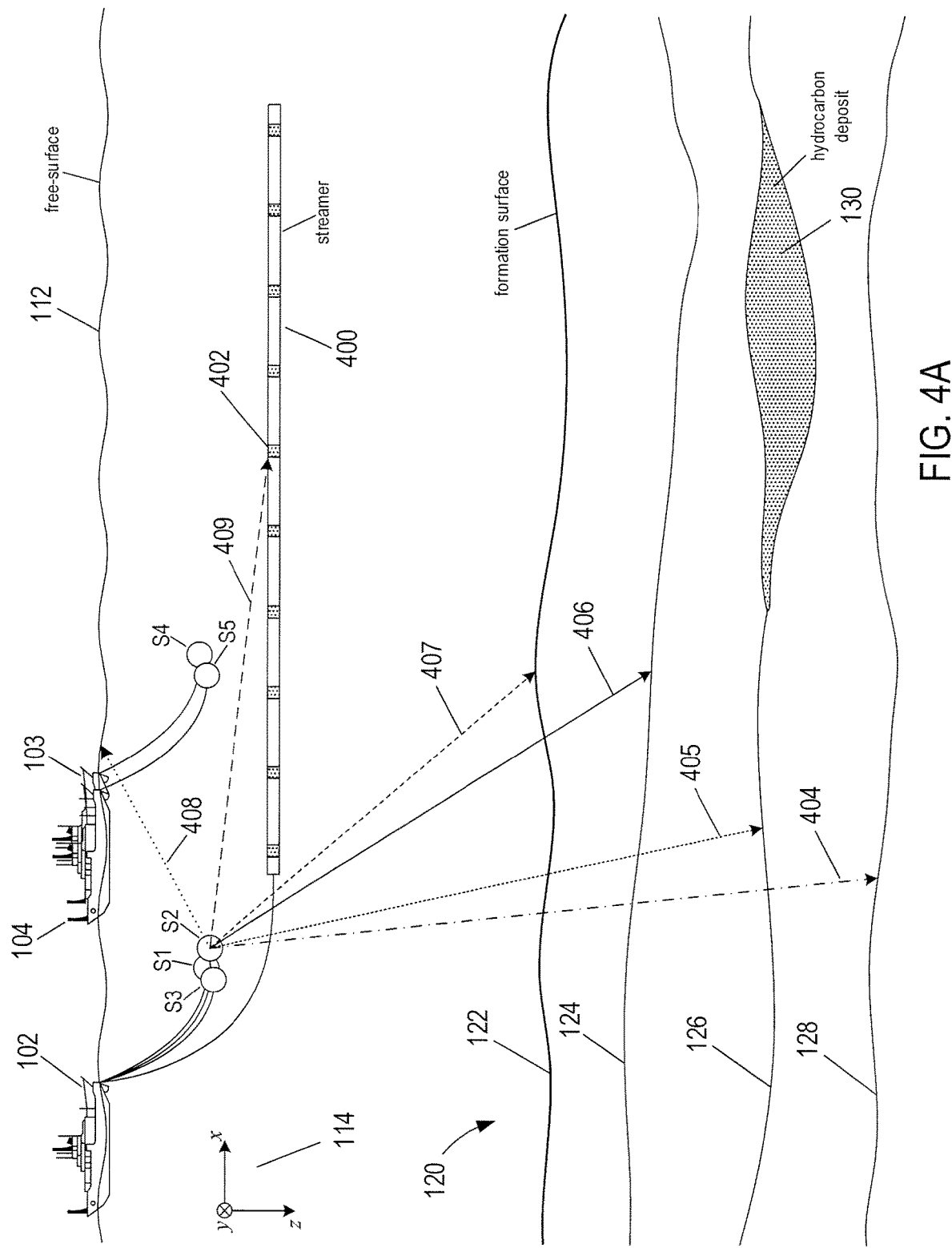
FIGS. 4A-4C show a snapshot of a streamer and different ways in which acoustic energy emitted from a source reverberates between a free surface and a subterranean formation before reaching a receiver.
Figure 4B:
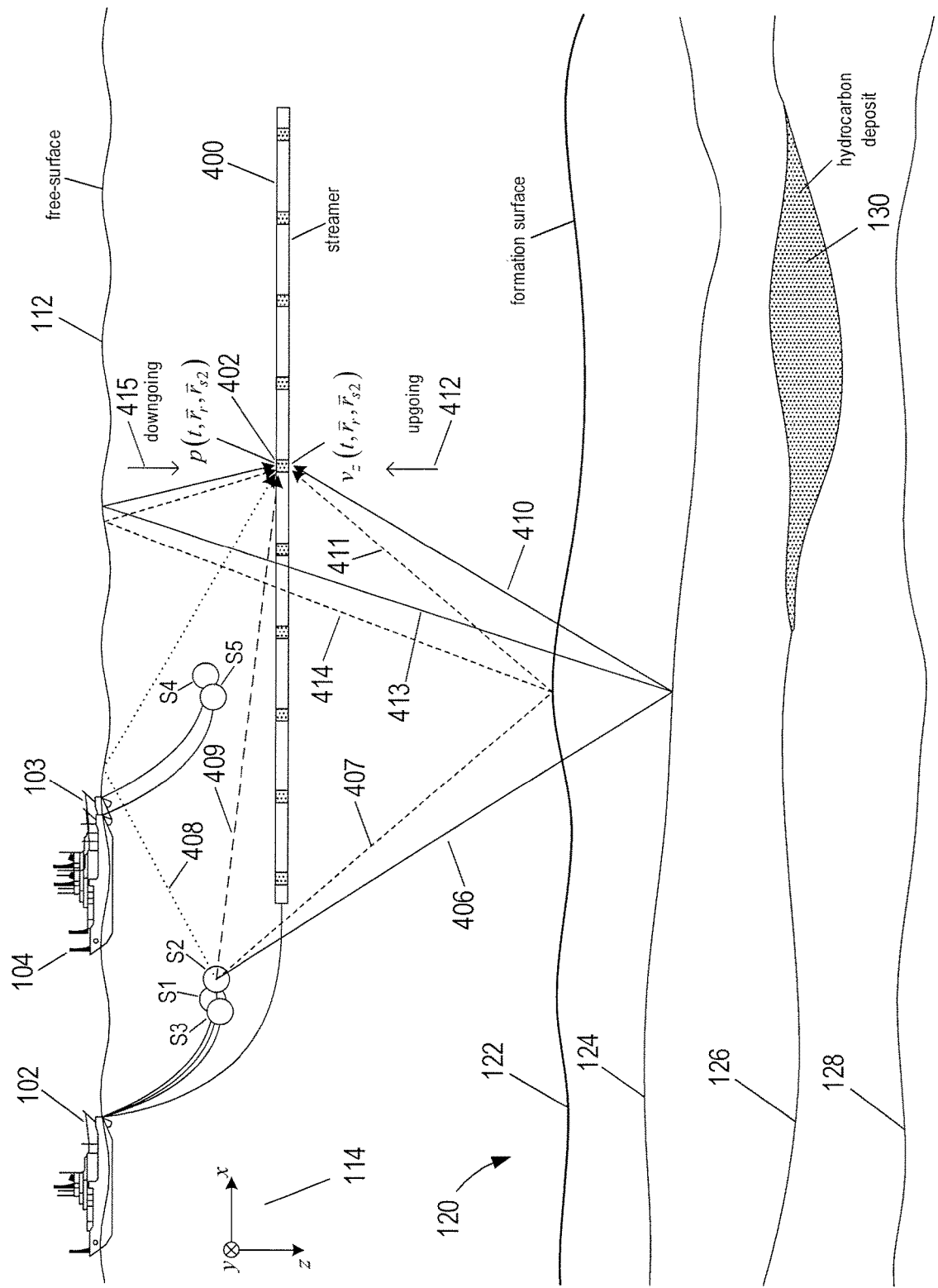
Figure 4C:
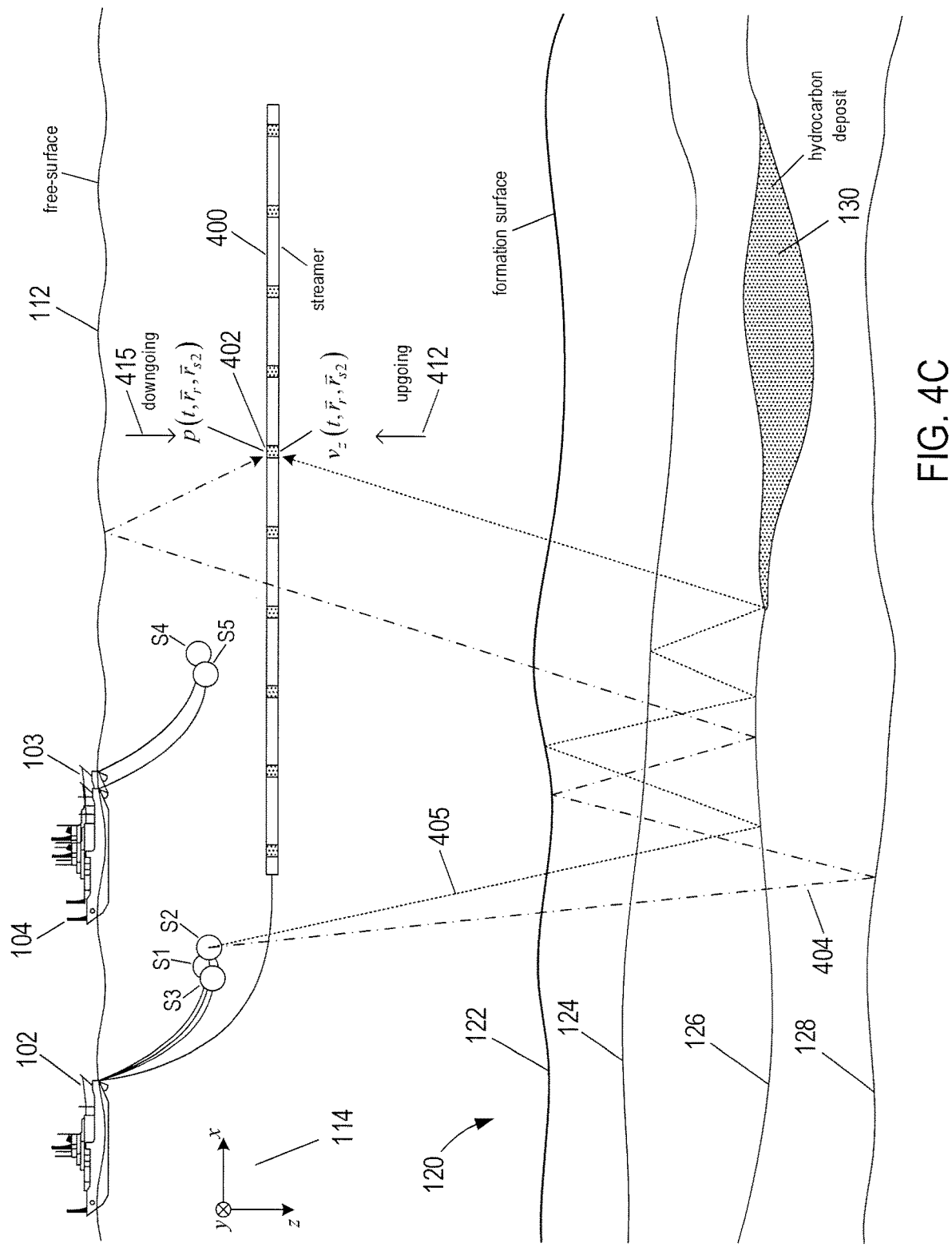

FIGS. 4A-4C show snapshots of different ways in which acoustic energy emitted from the source S2 reverberates between the free surface 112 and the subterranean formation 120 before reaching the receiver 402. For the sake of simplicity, FIGS. 4A-4C illustrate only a few of many possible ray paths acoustic energy of an acoustic signal created by the source S2 may travel before reaching the receiver 402. In FIG. 4A, directional arrows 404-409 represent ray paths of different portions of the acoustic signal generated by the source S2. For example, ray paths 404-407 represent portions of the acoustic signal that penetrate to different interfaces of the subterranean formation 102 and ray path 408 represents a portion of the acoustic signal that reaches the free surface 112. Ray path 409 represents the source signature, which is a portion of the acoustic signal that travels directly to the receiver 402. In FIG. 4B, ray path 408 is extended to present a downward reflection from the free surface 112 (i.e., source ghost). Ray paths 410 and 411 represent reflections from the interface 124 and the formation surface 122 that travel directly to the receiver 402, which are called "upgoing primary reflections" or "primaries," as indicated by upgoing directional arrow 412. Ray paths 413 and 414 represent reflections from the interface 124 and the formation surface 122 followed by downward reflections from the free surface 112 before traveling directly to the receiver 402, which are called "downgoing reflections" as indicated by directional arrow 415. In FIG. 4C, ray paths 404 and 405 are extended to represent multiple reflections between interfaces within the subterranean formation 120 and the free surface 112. Extended ray path 404 represents a downgoing free-surface multiple. Extended ray path 405 represents an upgoing multiple. In FIGS. 4B-4C, wavefields that are reflected downward from the free surface 112 before reaching the receivers, as represented by ray paths 413, 414, and 404, are examples of "downgoing wavefields" that may also be called "ghost wavefields." In FIGS. 4B-4C, wavefields that are reflected upward from the subterranean formation 120, before reaching the receivers, as represented by ray paths 410, 411, and 405, are examples of "upgoing wavefields." Seismic data may also include acoustic energy that propagated along interfaces as head waves (not shown) before being reflected upward to the surface 122 and acoustic energy that propagated into layers with velocity gradients that increase with depth due to compression, creating diving waves (not shown) that are gradually turned upward to the surface 122.

Each trace records the source signature, source ghost, primaries, and various types of free surface and subsurface multiples. For example, pressure wavefield $p(\vec{r}_r, \vec{r}_{s2}, t)$ generated at the receiver 402 records hydrostatic pressure changes due to the source signature, source ghost, primaries, and multiples. The vertical velocity wavefield 12, $v_z$ ($\vec{r}_r, \vec{r}_{s2}, t$) also generated at the receiver 402 records the particle velocity changes due to the direct source wavefield, source ghost, primaries, and multiples. The pressure wavefield $p(\vec{r}_r, \vec{r}_{s2}, t)$ and the vertical velocity wavefield $v_z$ ($\vec{r}_r, \vec{r}_{s2}, t$) record both upgoing and downgoing pressure and vertical velocity wavefields, respectively, that reach the receiver 402.

Figure 5:
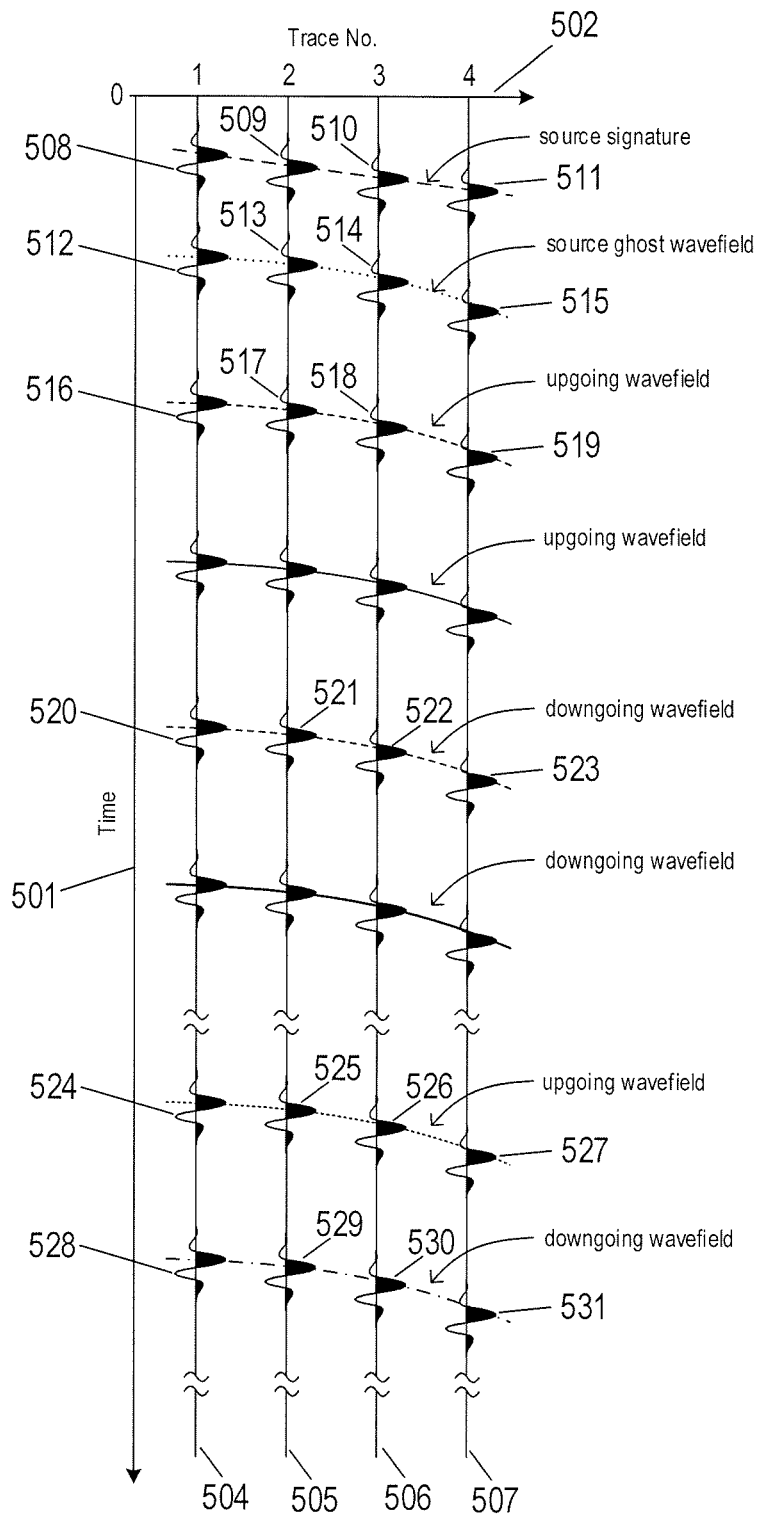
FIG. 5 shows a common-shot gather of source-related wavefields and reflected wavefields measured by receivers located along a streamer.

FIG. 5 shows an example common-shot gather of four example traces of wavefields measured by four adjacent receivers located along the streamer 400 shown in FIGS. 4A-4C. Vertical axis 501 represents time. Horizontal axis 502 represents trace numbers with trace "1" representing the seismic data generated by a receiver located closer to the source S2 than trace "4" representing the seismic data generated by a receiver located farther away from the source S2. The source S2 is activated at time zero. The distances along the traces 504-507 from time zero to the locations of the wavelets represent travel times of the acoustic energy that is output from the source S2 and eventually reaches the receivers located along the streamer 400. The traces 504-507 may represent variations in the amplitude of either the pressure wavefield or the particle motion wavefield measured by four adjacent receivers of the streamer 400. The example traces record events, such as an impulse wavefield and a reflected wavefield from a surface or interface, as wavelets located along patterned curves that correspond to the example ray paths that reach the receiver 402 in FIGS. 4A-4C. For example, wavelets 508-511 record the source signature of the source S2 that travels directly to the receivers as represented by dashed ray path 409 in FIG. 4A. Wavelets 512-515 record the source ghost as represented by dotted ray path 408 in FIG. 4B. Wavelets 516-519 record the primary reflected wavefield as represented by dashed-line ray path 411 in FIG. 4B. Wavelets 520-523 record the downgoing reflected wavefield as represented by dashed-line ray path 414 in FIG. 4B. Wavelets 524-527 record the subsurface multiple wavefield as represented by dotted-line ray path 405 in FIG. 4C. Wavelets 528-531 record the free-surface multiple wavefield as represented by dot-dashed-line ray path 404 in FIG. 4C. In FIG. 5, the events are identified as upgoing and downgoing wavefields as represented by the upgoing and downgoing ray paths that reach the receiver 402 in FIGS. 4B and 4C.

Traditional marine seismic surveys are performed by recording reflected wavefields in separate shot records following each activation of a source. The duration of the time interval between any two successive activations of the source is selected so that the acoustic energy of reflected wavefields created by previous activations of the source are minimized in a shot record created following a subsequent activation of the source. For example, a traditional marine survey may be performed by activating a source about every 10 to 12 seconds. Reflected wavefields are often recorded in shot records for about 8 to 12 seconds immediately following each activation of the source. The recording time interval of about 8 to 12 seconds minimizes the acoustic energy of reflected wavefields in a shot record created for a subsequent activation of the source, while minimizing the overall time for the marine survey.

Figure 6:
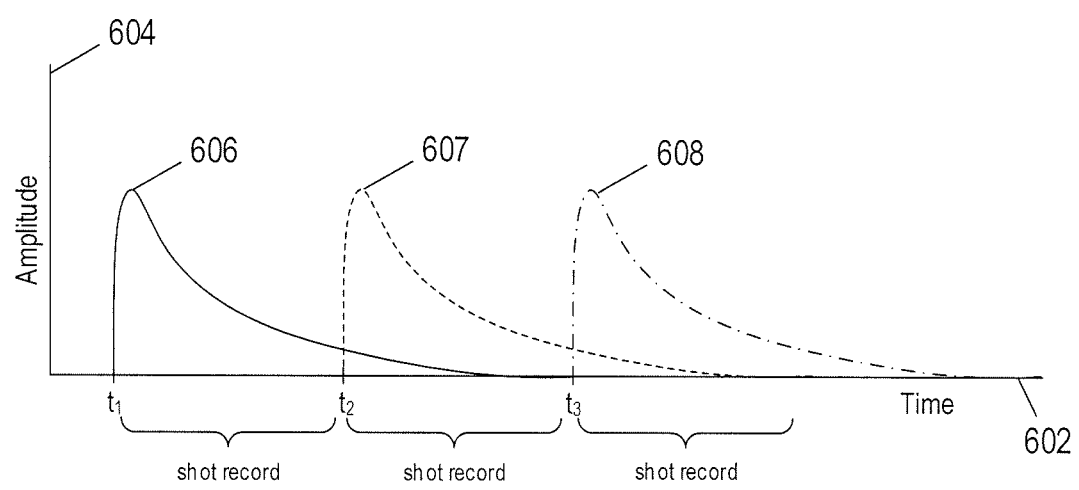
FIG. 6 shows an example plot of acoustic energies of reflected wavefields versus time.

FIG. 6 shows an example plot of acoustic energies of reflected wavefields versus time created for three source activations in accordance with traditional marine surveys. Horizontal axis 602 represents time. Vertical axis 604 represents that amplitude range of acoustic energy. Times $t_1$, $t_2$, and $t_3$ along time axis 602 denote source activation times. Patterned curves 606-608 represent acoustic energies of three reflected wavefields emanating from the subterranean formation in response to the three separate acoustic signals created by activating the three sources at the times $t_1$, $t_2$, and $t_3$, respectively. Each of the curves exponentially decreases with increasing time, representing attenuation of the acoustic energy of the corresponding reflected wavefields with time. Although acoustic energy created by a previous source activation may be present following a subsequence activation of the source, the times are selected so that only the tail or small portion of the acoustic energy created by a previous source activation may be present after a subsequence source activation.

Figure 7:
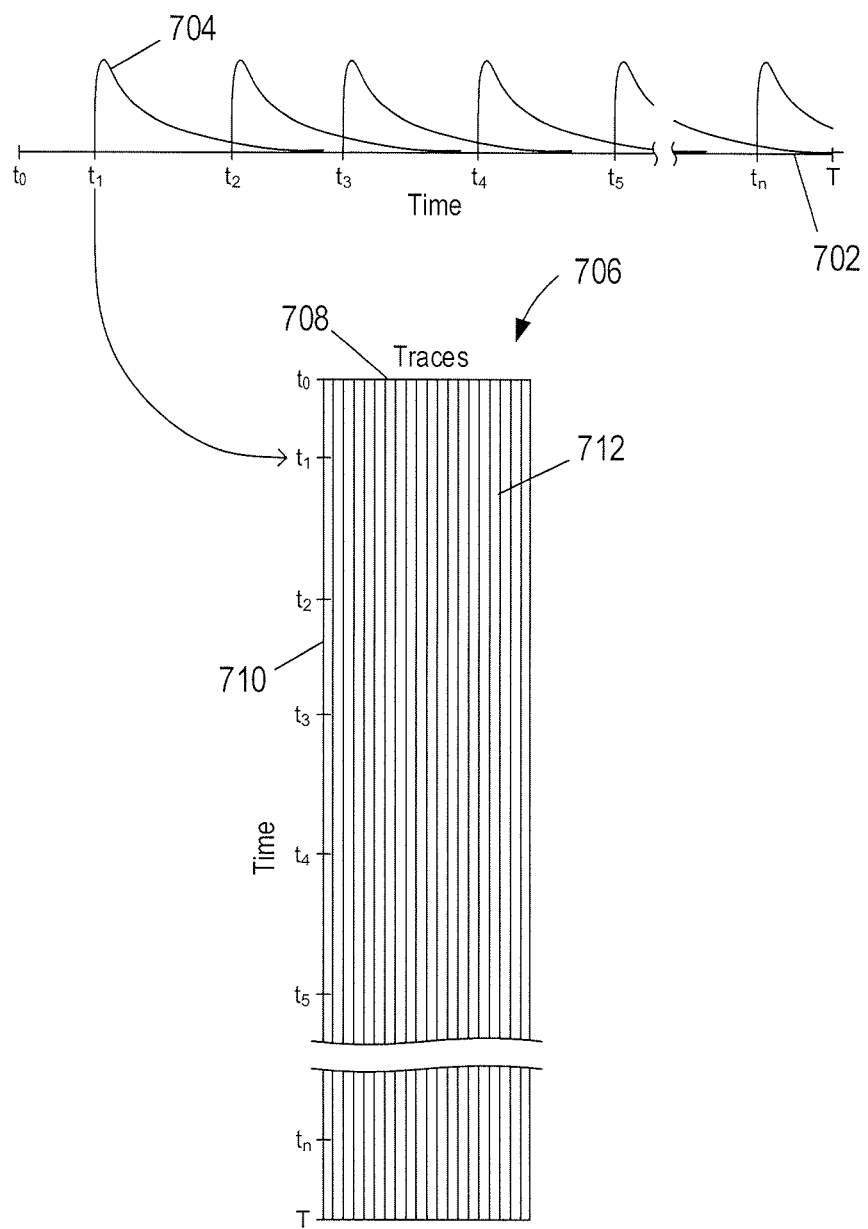
FIG. 7 shows an example of continuously recording reflected wavefields from a subterranean formation.

By contrast, with continuous recording, seismic data is continuously recorded while sources, or subsets of source elements, are activated at randomized times and locations. FIG. 7 shows an example of continuously recording reflected wavefields from a subterranean formation. FIG. 7 includes a time axis 702 with source-activation times $t_i$, where i=1, 2, . . . , n. Time $t_0$ represents a time when the receivers begin recording reflected wavefields. Time T represents a time when continuous recording of seismic data stops or pauses. Curves, such as curve 704, represent acoustic energies of reflected wavefields emanating from the subterranean formation in response to the separate acoustic signals created by activating the sources. FIG. 7 also shows a gather 706 of continuously recorded seismic data generated by pressure or particle motion sensors while sources are activated according to at the source-activation time along time axis 702. The gather includes a trace number axis 708 and a time axis 710 that corresponds to the time axis 702. Time $t_0$ corresponds the time when the survey begins, such as when the receivers begin continuously recording seismic data, times $t_1$, . . . , $t_n$ correspond to the source-activation times along the time axis 702, and T represents the time when continuous recording stops. Each line in the gather 706, such as line 712, represents a trace (wavelets not shown) of continuously generated pressure or particle motion data generated by a receiver. Each trace records reflected wavefields created by n source-activations.

With simultaneous source acquisition ("SSA"), multiple sources are activated in a body of water above a subterranean formation. While each source is activated to create a source wavefield, the acoustic energy created by previously activated sources continues to spread out and interact with the subterranean formation, creating overlapping reflected wavefields emanating from the subterranean formation. In SSA, all the sources are not necessarily activated at the same time. The multiples sources may be activated at random or according to a predetermined sequence to create the overlapping reflected wavefields. While the sources are activated, the overlapping reflected wavefields may be continuously recorded as blended seismic data in one or more data-storage devices. The blended seismic data comprises a blended pressure wavefield and/or a blended vertical velocity wavefield recorded by corresponding pressure and particle motion sensors.

Figure 8:
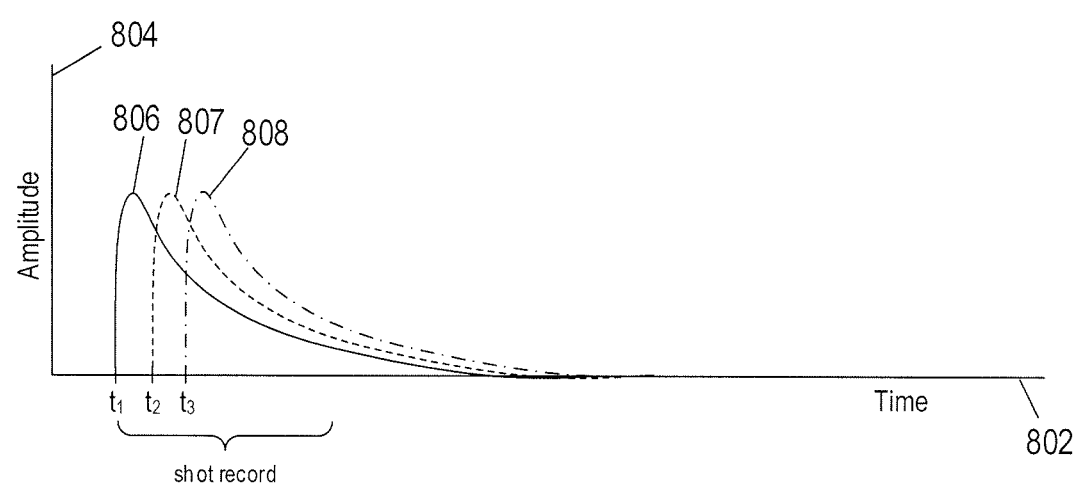
FIG. 8 shows an example plot of acoustic energies of overlapping reflected wavefields versus time for three sources.

FIG. 8 shows an example plot of acoustic energies of overlapping reflected wavefields versus time for three sources activated using SSA. In this example, times $t_1$, $t_2$, and $t_3$ along time axis 802 denote randomized times when the three sources activated. Patterned curves 806-808 represent overlapping acoustic energies of three reflected wavefields emanating from the subterranean formation in response to the three separate acoustic signals created by activating the three sources at the times $t_1$, $t_2$, and $t_3$, respectively. Each of the curves exponentially decreases with increasing time, representing attenuation of the acoustic energy of the corresponding reflected wavefields with time. But unlike the acoustic energy created by a source in a traditional survey, in SSA the acoustic energy created by a previous a source activation may be present with substantial amplitude after two or more source activations.

Figure 9:
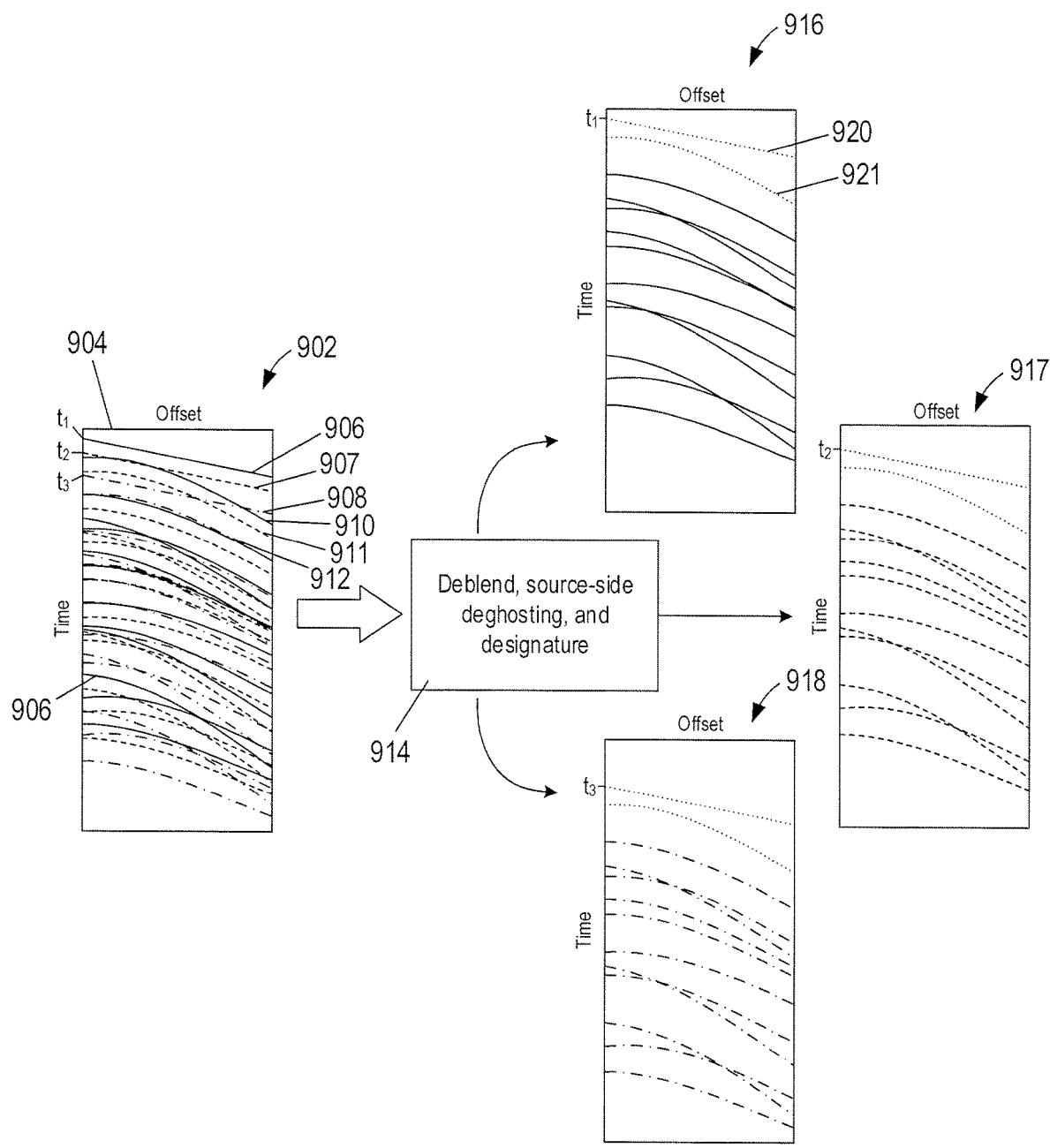
FIG. 9 shows an example of deblending blended seismic data.

FIG. 9 shows an example common-shot gather of blended seismic data 902 obtained from recording overlapping wavefields created by the three source activations in continuous recording and/or SSA. The blended seismic data 902 may be a blended pressure wavefield or a blended vertical velocity wavefield. Horizontal axis 904 represents source-receiver offset. Vertical axis 906 represents time. Common-shot gather of blended seismic data 902 records source signatures 906-908, source ghosts 910-912, and reflection events of the three wavefields. For the sake of discussion, the wavefields as represented by differently patterned curves. For example, solid curves represent source signature, source ghost, and reflection events associated with a source activation at time $t_1$. Dashed curves represent source signatures, source ghosts, and reflection events associated with a source activation at time $t_2$. Dot-dashed curves represent source signatures, source ghosts, and reflection events associated with a source activation at time $t_3$. Block 914 represents the computational process of deblending the common-shot gather 902 and attenuating the source signatures and source ghosts to obtain common-shot gather of a deblended wavefield data 916-918 with attenuated source signatures and source ghosts. Attenuated source wavefields are represented by dotted curves in each of the deblended common-shot gathers 916-918. For example, in common-shot gather of deblended wavefield data 916, dotted curves 920 and 921 represent attenuated source signature 906 and source ghost 910 in blended common-shot gather 902.

Seismic Imaging

Figure 10:
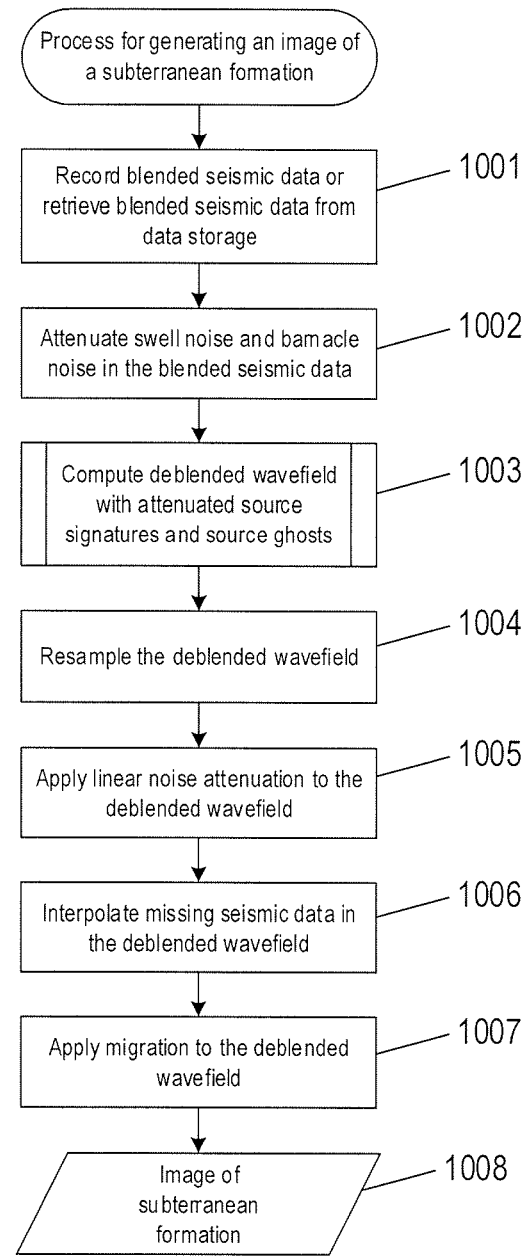
FIG. 10 shows a process for generating an image of a subterranean formation from blended seismic data recorded in a marine seismic survey of the subterranean formation.

FIG. 10 shows a process for generating an image of a subterranean formation from blended seismic data collected in a marine seismic survey using continuous recording or SSA. Each block represents a different module of computer implemented machine-readable instructions stored in one or more data-storage devices and executed using one or more processors of a computer system. It should be noted that the series of modules represented in FIG. 10 is not an exhaustive list of the modules that may be used to compute an image of a subterranean formation from recorded seismic data. Processing may include additional modules or certain modules may be omitted or placed in a different ordering, depending on, for example, how the blended seismic data is collected, conditions under which the recorded seismic data is collected, and depth of the body of water above the subterranean formation.

In FIG. 10, block 1001 represents blended seismic data recorded using the continuous recording and/or SSA as described above. The recorded blended seismic data may be pressure and vertical velocity wavefields recorded using receivers configured with collocated pressure and particle motion sensors. In block 1002, swell noise and barnacle noise in the recorded blended seismic data is attenuated. In block 1003, a "compute deblended wavefield with attenuated source signatures and source ghosts" procedure is performed to deblend the recorded blended seismic data and attenuate source signatures and source ghost. An example implementation of "compute deblended wavefield with attenuated source signatures and source ghosts" is described below with reference to FIGS. 19-24. In block 1004, the gathers of deblended wavefield may be resampled. For example, the traces of a gather of deblended wavefield data may be resampled to have the same sampling rate, such as a sample rate of 4 data points per millisecond. In block 1005, linear noise in the resampled data may be attenuated by subtracting modeled linear noise from the resampled data. Because the receivers undulate during seismic data recording, the in-line and cross-line receiver locations of the traces may be irregularly spaced during recording of the blended seismic data. In block 1006, interpolation may be applied to replace corrupted traces or fill in traces of missing seismic data, such as interpolating traces in the cross-line direction where receivers are spaced farther apart than in the in-line direction. In block 1007, migration is applied to the gathers of deblended wavefield in either the space-time coordinate system (i.e., time migration) or Cartesian coordinate system (i.e., depth migration) to obtain an image of the subterranean formation 1008.

Computing Deblended Wavefield with Attenuated Source Signatures and Source Ghosts from Blended Seismic Data Processes and systems for deblending blended seismic data with attenuated source signatures and source ghosts are described below. The following description of FIGS. 11A-18 introduces the notation and terminology used to describe an example implementation of the processes and systems for deblending and attenuating source signature and source ghosts in recorded blended seismic data referred to in step 914 of FIG. 9. FIGS. 19-24 are example flow diagrams of computational operations that may be performed to deblend, and to attenuate the source ghost and the source signatures, recorded blended seismic data.

Acoustic reciprocity of time convolution (See e.g., *Seismic Applications of Acoustic Reciprocity*, by J. T Fokkema and P. M. van den Berg, pp. 95-103, Elsevier Science 1993) gives the following integral relationship, in the space-frequency domain, between a blended up-going pressure wavefield and downgoing vertical velocity source wavefields created by $N_s$ sources:

$$\sum_{i=1}^{N_s} P^-(\omega, \vec{r}_r | \vec{r}_{si}) = \qquad (2)$$
$$-2i\omega\rho \int_{-\infty}^{\infty} R_{sub}^{-+}(\omega, \vec{r}_r | \vec{r}_{sep}) \sum_{i=1}^{N_s} V_{sz}^+(\omega, \vec{r}_{sep} | \vec{r}_{si}) d\vec{x}_{sep}$$

where
ρ is the density of the body of water;
ω is the angular frequency;
$\sum_{i=1}^{N_s} P^-(\omega, \vec{r}_r, \vec{r}_{si})$ is the blended upgoing pressure wavefield at receiver location $\vec{r}_r$;
$\sum_{i=1}^{N_s} V_{sz}^+(\omega, \vec{r}_{sep} | \vec{r}_{si})$ is the downgoing vertical velocity source wavefield at a location $\vec{r}_{sep}$ on a planar separation level located between the sources and the receiver; and
$R_{sub}^{-+}(\omega, \vec{r}_r, \vec{r}_{sep})$ is the deblended wavefield with attenuated source signatures and source ghosts at the receiver location $\vec{r}_r$.
The sign '−' denotes an upgoing wavefield. The sign '+' denotes a downgoing wavefield. The combination of signs '−+' denotes a receiver-side upgoing wavefield and a source-side downgoing wavefield. The bar '|' in the wavefields of Equation (2), and subsequent equations, separates receiver locations on the left-hand side of the bar from source locations on the right-hand side of the bar. The depth of a planar virtual separation level, denoted by $S_{sep}$, is located between the sources and the receiver with $z_{si} > z_{sep} > z_r$ for i=1, . . . , N, and $z_{sep}$ is the depth of the separation level $S_{sep}$. The blended upgoing pressure wavefield of Equation (2) may be computed by applying wavefield separation to the blended pressure wavefield recorded at the receiver location $\vec{r}_r$ in the manner described below with reference to Equations (8a)-(10). The downgoing vertical velocity source wavefield of Equation (2) may be modeled using notional source signatures obtained from nearfield measurements of pressure wavefields generated by the source elements of the sources as described below with reference to Equations (11)-(22).

FIG. 11A shows an example illustration of ray paths of blended upgoing pressure wavefields 1100 that reach a receiver. Stars 1101-1104 represent four sources 1101-1104 at corresponding source locations $\vec{r}_{s1}$, $\vec{r}_{s2}$, $\vec{r}_{s3}$, and $\vec{r}_{s4}$. The four sources 1101-1104 may be sources as described above with reference to FIGS. 1A-1B, or the four sources 1101-1104 may be sub-sources of a single source towed by a survey, as described above with reference to FIG. 2. Inverted triangle 1106 represents a receiver at receiver location $\vec{r}_r$, such as the receiver described above with reference to FIG. 3. The sources 1101-1104 and receiver 1106 are located below a time-varying free surface 1108 of a body of water and above a subterranean formation 1110. Although the sources 1101-1104, receiver 1106, and free surface 1108, are shown in vertical plane cross-section, the free surface 1108 extends in the y-direction and the sources 1101-1104 and receiver 1106 do not necessarily lie in a vertical plane. In FIG. 11A, example paths and directions of propagating wavefronts of acoustic energy generated by the sources 1101-1104 that arrive at the receiver 1106 as upgoing wavefields are represented by ray paths. For example, ray path 1112 represents the path of a wavefront of acoustic energy generate by the source 1101 and is reflected upward from the subterranean formation before reaching the receiver 1106 as an upgoing wavefield. Ray path 1114 represents the path of a wavefront of acoustic energy that is also generate by the source 1101 and is reflected downward from the time-varying free surface 1108 before being reflected upward from the subterranean formation 1110 and reaching the receiver 1106 as an upgoing wavefield. The blended upgoing pressure wavefield created by activating the four sources 1101-1105 at the location of the receiver 1106 is given by $\sum_{i=1}^{4} P^-(\omega, \vec{r}_r | \vec{r}_{si})$.

FIG. 11B shows an example illustration of ray paths of downgoing vertical velocity source wavefields 1115 that reach locations along the separation level $S_{sep}$. Dashed line 1116 represents a cross section of the separation level $S_{sep}$. Although the separation level $S_{sep}$ is represented by a dashed line in the vertical plane cross-section, the separation level $S_{sep}$ is a two-dimensional virtual surface that lies in the xy-plane between the sources 1101-1104 and the receiver 1106. In FIG. 11B, example paths and directions of propagating wavefronts of acoustic energy generated by the sources 1101-1104 that arrive at virtual receivers located on the separation level $S_{sep}$ are represented by ray paths. For example, ray path 1118 represents the path of a wavefront of acoustic energy that is generate by the source 1103 and travels directly to a virtual receiver 1120 on the separation level $S_{sep}$. Ray path 1122 represents the path of a wavefront of acoustic energy that is also generate by the source 1103 and is reflected downward from the time-varying free surface 1108 before reaching a virtual receiver 1124 on the separation level $S_{sep}$. The downgoing vertical velocity source wavefields created by activating the four sources 1101-1105 arrive at the location $\vec{r}_{sep}$ of virtual receiver on the separation level $S_{sep}$ is given by $\sum_{i=1}^{4} V_{sz}^+(\omega, \vec{r}_{sep} | \vec{r}_{si})$.

Figure 11C:
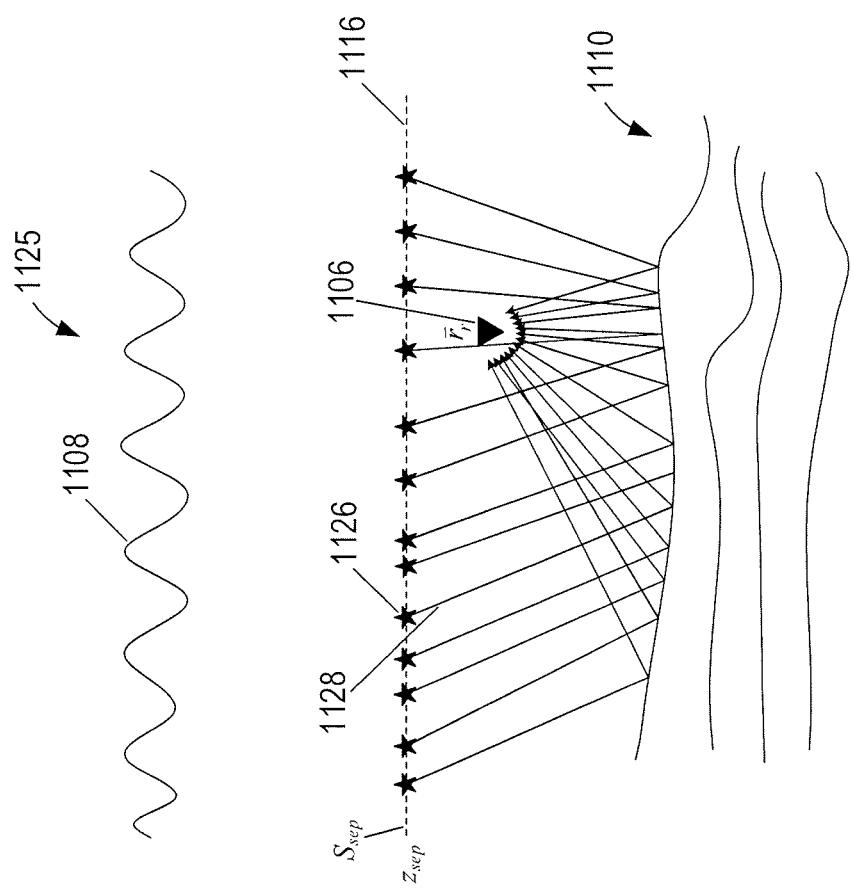
FIG. 11C shows example ray paths of deblended wavefield with attenuated source signatures and source ghosts in the space-time domain.

FIG. 11C shows an example illustration of ray paths of a deblended wavefield with attenuated source signatures and source ghosts 1125 that reach the receiver 1106. The source wavefields include source signatures and source ghosts created by activating the sources. The virtual receivers on the separation level $S_{sep}$ in FIG. 11B have become virtual sources at the same locations on the separation level $S_{sep}$ in FIG. 11C. For example, virtual source 1126 in FIG. 11C corresponds to virtual receiver 1120 in FIG. 11B. In FIG. 11C, ray paths represent the deblended wavefield with attenuated source signatures and source ghosts generated by virtual sources located on the separation level $S_{sep}$. The deblended wavefield with attenuated source signature and source ghost, $R_{sub}^{-+}(\omega, \vec{r}_r | \vec{r}_{sep})$, represents acoustic energy that propagates downward from a virtual source at a location $\vec{r}_{sep}$ along the separation level $S_{sep}$ and is reflected upward from the subterranean formation 1110 to the receiver 1106 at the location $\vec{r}_r$. For example, ray path 1128 represents acoustic energy that propagates downward from the virtual source 1128 and is reflected upward from the subterranean formation 1110 to the receiver 1106. The acoustic energy represented by ray path 1128 is a reflection event from the subterranean formation that does not include the source signatures and source ghosts.

Figure 12:
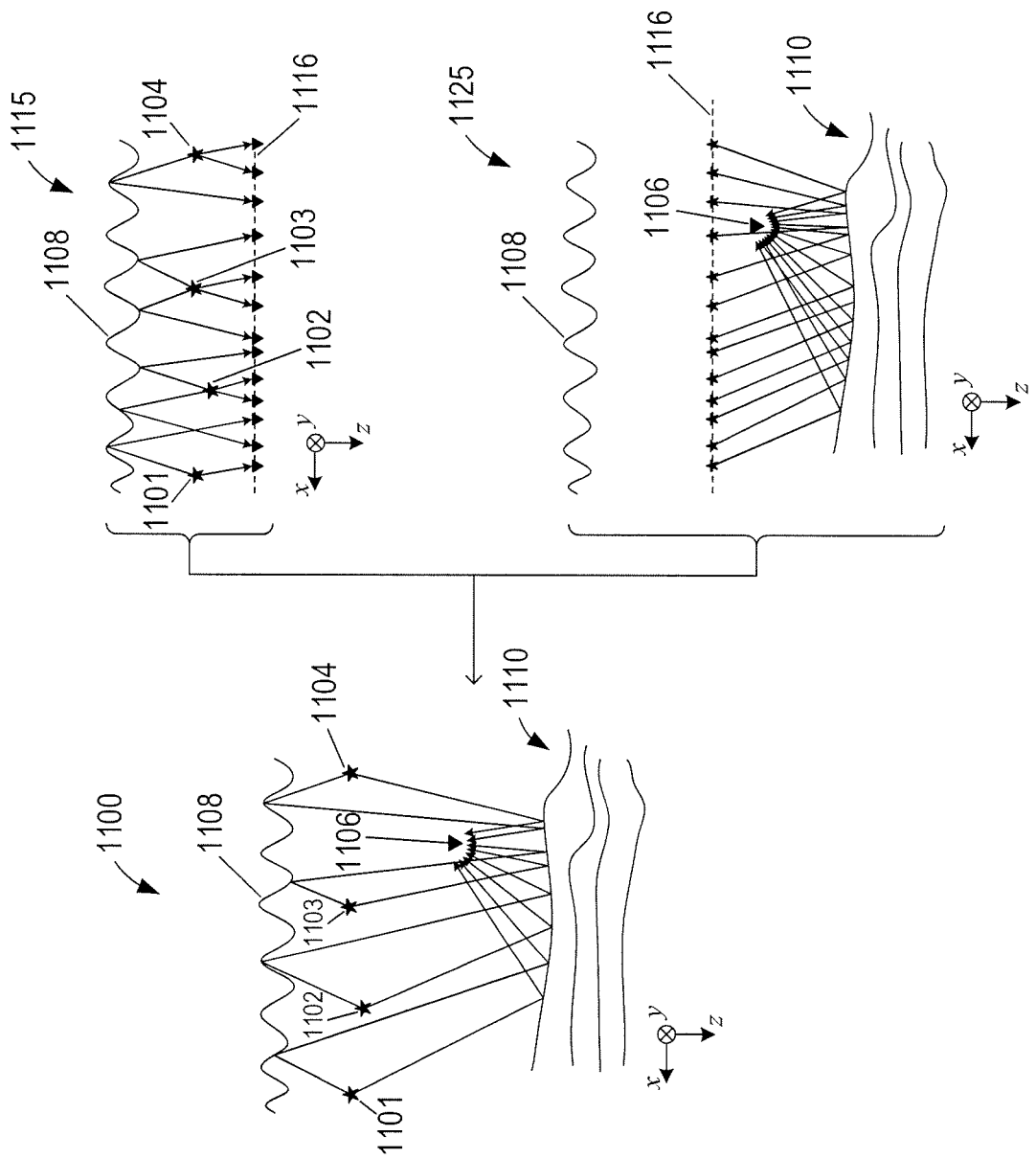
FIG. 12 illustrates coupling a downgoing vertical velocity source wavefield with deblended wavefield to obtain an upgoing pressure wavefield in the space-time domain.

Equation (2) equates an upgoing pressure wavefield with attenuated source signatures and source ghosts to the downgoing vertical velocity source wavefields of $N_s$ sources and the deblended wavefield with attenuated source signatures and source ghosts based on acoustic reciprocity. FIG. 12 conceptually illustrates in the space-time domain equating the downgoing vertical velocity source wavefield, shown in FIG. 11B, with the deblended wavefield with attenuated source signatures and source ghosts, shown in FIG. 11C, to the upgoing pressure wavefield, shown in FIG. 11A.

The integral relationship of Equation (2) may be computed using a summation approximation:

$$\sum_{i=1}^{N_s} P^-(\omega, \vec{r}_r | \vec{r}_{si}) \approx \qquad (3)$$

$$-2i\omega\rho \sum_{\vec{r}_{sep} \in S_{sep}} R_{sub}^{-+}(\omega, \vec{r}_r | \vec{r}_{sep}) \sum_{i=1}^{N_s} V_{sz}^+(\omega, \vec{r}_{sep} | \vec{r}_{si}) \Delta \vec{x}_{sep}$$

where $\vec{r}_{sep} \in S_{sep}$ represents locations on the separation level $S_{sep}$; and $\Delta \vec{x}_{sep} = \Delta x_{sep} \Delta y_{sep}$ is separation between space-apart locations in the x- and y-directions on the separation level. Equation (3) may be used to form a system of equations for $N_r$ receivers and $N_{sep}$ virtual receivers, or virtual sources, at the separation level $S_{sep}$:

$$P^- \approx -2i\omega\rho R_{sub}^{-+} V_{sz}^+ \qquad (4)$$

where $P^-$ is an $N_r \times 1$ blended upgoing pressure wavefield matrix;

$V_{sz}^+$ is an $N_{sep} \times 1$ downgoing vertical velocity source wavefield matrix; and $R_{sub}^{-+}$ is an $N_r \times N_{sep}$ a deblended wavefield matrix with attenuated source signatures and source ghosts.

System of Equations (4) relates the blended upgoing wavefield matrix $P^-$ to a product of the matrix $R_{sub}^{-+}$ of deblended wavefield data with attenuated source signatures and source ghosts and the downgoing vertical velocity source wavefield matrix V.

FIG. 13 shows a matrix representation of the systems of Equations (4). Column matrix 1302 displays the matrix elements of the blended upgoing wavefield matrix $P^-$. Elements of the column matrix 1302 are given by $\Sigma_{i=1}^{N_s} P^-(\omega, \vec{r}_{rj} | \vec{r}_{si})$, where receiver subscript j=1, . . . , $N_r$. Each element of the column matrix 1302 is a trace of blended upgoing pressure wavefield seismic data recorded by one of the $N_r$ receivers for activation of $N_s$ sources. Column matrix 1304 displays the matrix elements of the downgoing vertical velocity source wavefield matrix $V_{sz}^+$. Elements of the column matrix 1304 are given by $\Sigma_{i=1}^{N_s} V_{sz}^+(\omega, \vec{r}_{sepk} | \vec{r}_{si})$, where locations at the separation level have a subscript k=1, . . . , $N_{sep}$. Matrix 1306 displays the matrix elements of the deblended wavefield with attenuated source signatures and source ghosts. Elements of the matrix 1306 are given by $R_{sub}^{-+}(\omega, \vec{r}_{rj} | \vec{r}_{sepk})$ where j=1, . . . , $N_r$, and k=1, . . . , $N_{sep}$. Each element of the deblended wavefield matrix 1306 is a trace of deblended wavefield data with attenuated source signatures and source ghosts at one of the $N_r$ receivers. However, the deblended wavefield matrix $R_{sub}^{-+}$ cannot be computed directly from the system of Equations (4), because the system of Equations (4) is underdetermined.

A system of equations used to solve for the matrix $R_{sub}^{-+}$ may be formed by introducing an intermediate level, denoted by $S_{arb}$, between the sources and the separation level $S_{sep}$, where locations on the intermediate level $S_{arb}$ are denoted by $\vec{r}_{arb} = (x_{arb}, y_{arb}, z_{arb})$ with $z_{si} > z_{arb} > z_{sep}$ for i=1, . . . , $N_s$. Let $\Sigma_{i=1}^{N_s} V_{sz}^+(\omega, \vec{r}_{arb} | \vec{r}_{si})$ represent the downgoing vertical velocity source wavefield at a location $\vec{r}_b$ on the intermediate level $S_{arb}$ in the space-frequency domain.

Figure 14:
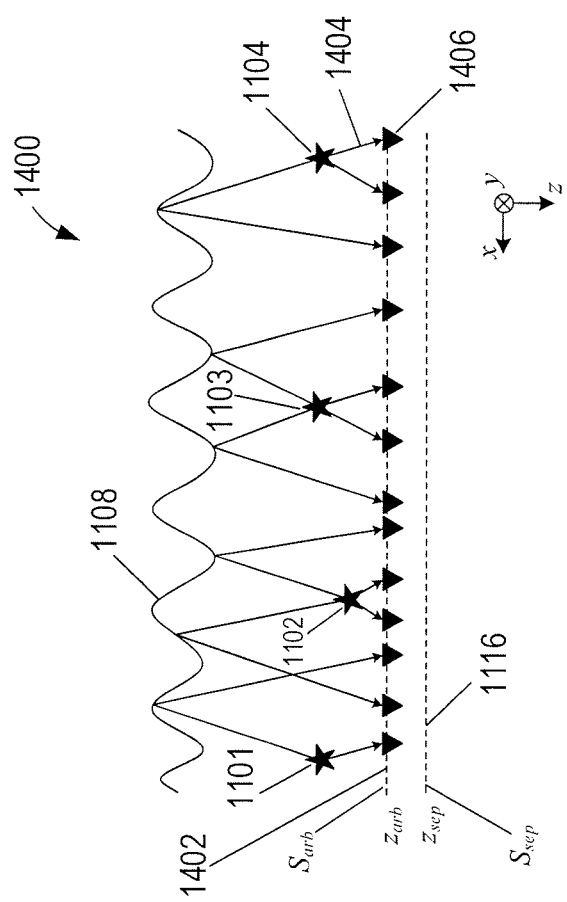
FIG. 14 shows example ray paths of downgoing vertical velocity source wavefields that reach locations along an intermediated level in the space-time domain.

FIG. 14 shows example ray paths of downgoing vertical velocity source wavefields 1400 that reach locations along an example intermediated level $S_{arb}$. Dashed line 1402 represents a cross section of the intermediate level $S_{arb}$. Although the intermediate level 1402 is represented by a dashed line in the vertical plane cross-section, the intermediate level $S_{arb}$ is a two-dimensional virtual surface that lies in the xy-plane between the sources 1101-1104 and the separation level $S_{sep}$. In FIG. 14, example paths and directions of propagating wavefronts of acoustic energy generated by the sources 1101-1104 that arrive at virtual receivers located on the intermediate level $S_{arb}$ are represented by ray paths. For example, ray path 1404 represents the path of a wavefront of acoustic energy that is generated by the source 1104 and travels directly to a virtual receiver 1406 on the intermediate level $S_{arb}$. The downgoing vertical velocity source wavefield created by activating the four sources 1101-1104 arrive at a virtual receiver with a location $\vec{r}_{arb}$ of the intermediate level $S_{arb}$ is given by $\Sigma_{i=1}^4 V_{sz}^+(\omega, \vec{r}_{arb} | \vec{r}_{si})$ Equation (3) is multiplied on both the left-hand side and the right-hand side by a Hermitian transpose of the downgoing vertical velocity source wavefield at a location $\vec{r}_{arb}$ of the intermediate level $S_{arb}$ to obtain $$C(\omega, \vec{r}_r | \vec{r}_{arb}) \approx -2i\omega\rho \sum_{\vec{r}_{sep} \in S_{sep}} R_{sub}^{-+}(\omega, \vec{r}_r | \vec{r}_{sep}) \Gamma(\omega, \vec{r}_{sep} | \vec{r}_{arb}) \Delta \vec{x}_{sep} \qquad (5a)$$

where $$C(\omega, \vec{r}_r | \vec{r}_{arb}) = \sum_{i=1}^{N_s} P^-(\omega, \vec{r}_r | \vec{r}_{si}) \left[ \sum_{i=1}^{N_s} V_{sz}^+(\omega, \vec{r}_{arb} | \vec{r}_{si}) \right]^H \qquad (5b)$$

-continued $$\Gamma(\omega, \vec{r}_{sep} | \vec{r}_{arb}) = \sum_{i=1}^{N_s} V_{sz}^+(\omega, \vec{r}_{sep} | \vec{r}_{si}) \left[ \sum_{i=1}^{N_s} V_{sz}^+(\omega, \vec{r}_{arb} | \vec{r}_{si}) \right]^H \quad (5c)$$

and the superscript "H" denotes the Hermitian transpose. The wavefield $C(\omega, \vec{r}_r | \vec{r}_{arb})$ is the correlation wavefield between the blended upgoing pressure wavefield and the downgoing vertical velocity source wavefield. The wavefield $\delta(\omega, \vec{r}_{sep} | \vec{r}_{arb})$ is the point spread function for the downgoing vertical velocity source wavefield between the separation and intermediate levels. Equation (5a) couples the point spread function and the deblended wavefield with attenuated source signatures and source ghosts to the correlation wavefield.

Figure 15A:
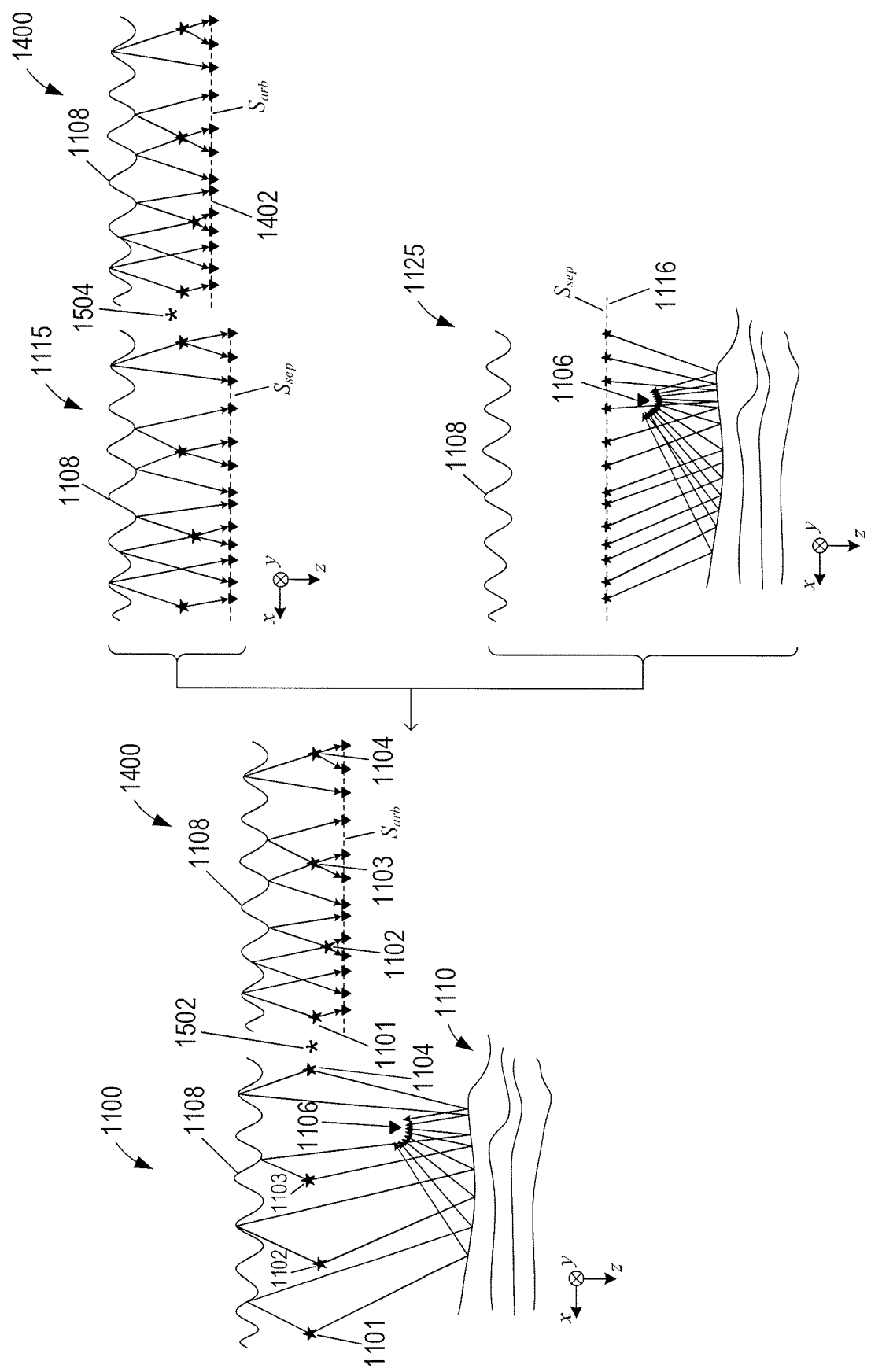
FIGS. 15A-15B illustrate convolving a downgoing vertical velocity source wavefield with an upgoing pressure wavefield and with deblended wavefield in the space-time domain.
Figure 15B:
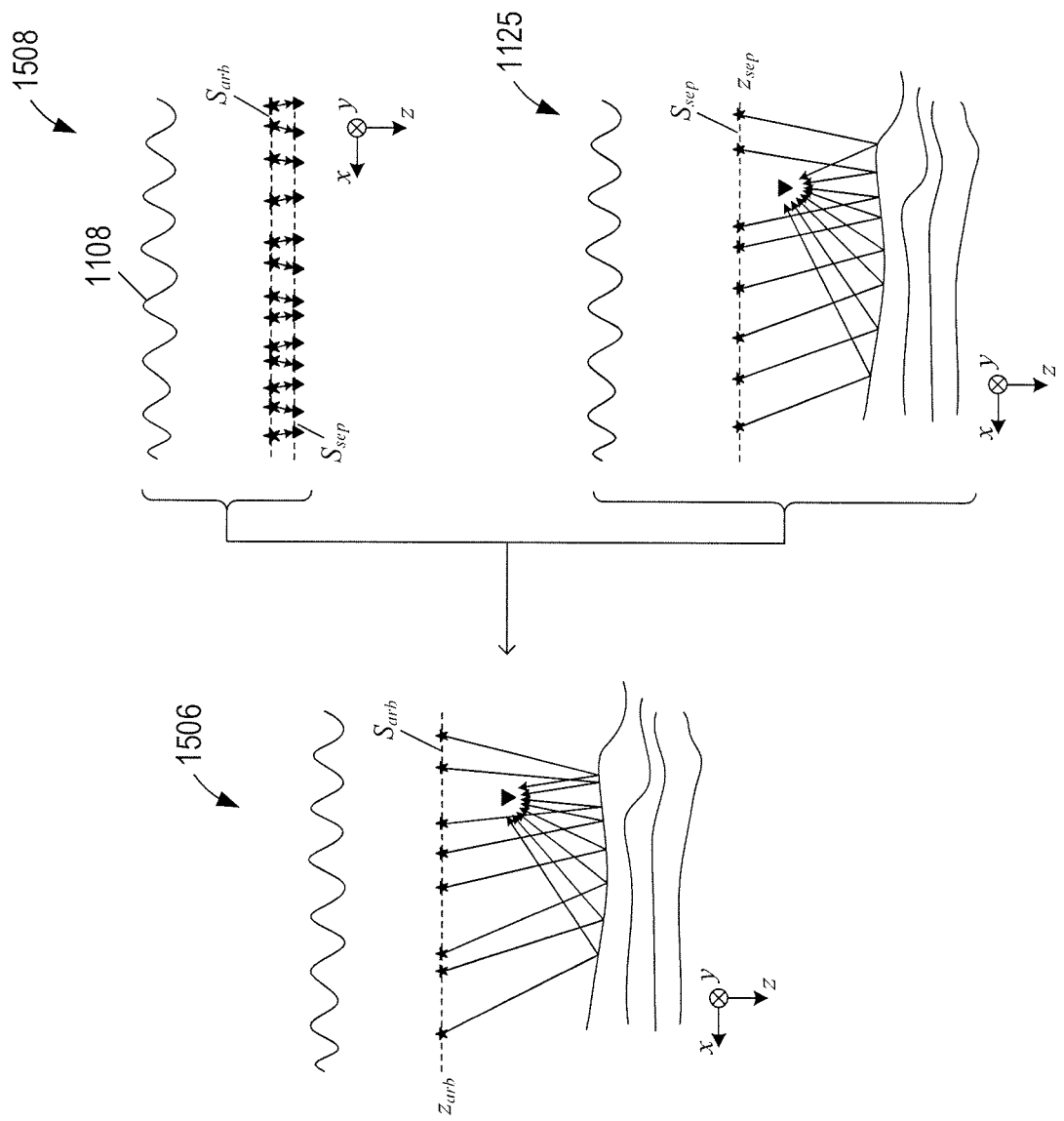

FIGS. 15A-15B conceptually illustrate convolving on the left- and right-hand sides of wavefields in Equation (3) with the time reversed downgoing vertical velocity source wavefield in the space-time domain. In FIG. 15A, the time reversed downgoing vertical velocity source wavefield 1400 is convolved 1502 with the blended upgoing pressure wavefield 1100, and the time reversed downgoing vertical velocity source wavefield 1400 is convolved 1504 with the downgoing vertical velocity source wavefield 1115. In FIG. 15B, convolution of the time reversed downgoing vertical velocity source wavefield 1400 with the blended upgoing pressure wavefield 1100 gives the correlation wavefield 1506. Convolution of the time reversed downgoing vertical velocity source wavefield 1400 with the downgoing vertical velocity source wavefield 1115 gives the point spread function 1508.

Equations (5a)-(5c) may be used to fond a system of equations for $N_r$ receivers, $N_{sep}$ virtual receivers at the separation level $S_{sep}$, and $N_{arb}$ virtual sources at the intermediate level $S_{arb}$ $$C \approx 2i\omega\rho R_{sub}^{-+} \Gamma \quad (6)$$

FIG. 16 shows a matrix representation of the system of Equations (6). Elements of a correlation wavefield matrix C 1602 are given by $C(\omega, \vec{r}_{rj} | \vec{r}_{arbq})$, where locations on the intermediate level $S_{arb}$ have a subscript q=1, ..., $N_{arb}$. Elements of the point spread matrix $\Gamma$ 1604 are given by $\delta(\omega, \vec{r}_{sepk} | \vec{r}_{arbq})$, where k=$N_{sep}$ and q=1, ..., $N_{arb}$. The deblended wavefield matrix $R_s t$ may be computed using the system of Equations (6) by applying a least squares optimization. The deblended wavefield matrix with attenuated source signatures and source ghosts is given by $$R_{sub}^{-+} \approx \frac{-1}{2i\omega\rho} C(\Gamma)^T \left( \Gamma(\Gamma)^T - I\varepsilon \right)^{-1} \quad (7)$$

Each element $R_{sub}^{-+}(\omega, \vec{r}_{rj} | \vec{r}_{sepk})$ of the matrix $R_{sub}^{-+}$ is a trace of seismic data with attenuated source signature and source ghost at the receiver location $\vec{r}_{rj}$. Elements of the matrix $R_{sub}^{-+}$ may be selected to form gathers of seismic data with attenuated source signatures and source ghosts in different domains and may be further processes according to the steps of FIG. 10 to obtain high-resolution images of the subterranean formation without ghost effects created by multiple sources and without contamination of the images from the source signatures.

Determining the Blended Upgoing Pressure Wavefield

The blended upgoing pressure wavefield $\Sigma_{i=1}^{N_s} P^-(\omega, \vec{r}_r | \vec{r}_{si})$ of Equations (2) and (3) may be computed from the blended pressure wavefield and blended vertical velocity wavefield measured at collocated pressure and particle motion sensors. Let $\Sigma_{i=1}^{N_s} p(\vec{r}_r, \vec{r}_{si}, t)$ represent the blended pressure wavefield created by the $N_s$ sources and measured by a pressure sensor at the receive location $\vec{r}_r$. Let $\Sigma_{i=1}^{N_s} v_z(\vec{r}_r, \vec{r}_{si}, t)$ represent the blended vertical velocity wavefield created by the $N_s$ sources and measured by a particle motion sensor collocated with the pressure sensor at the receive location $\vec{r}_r$. The blended pressure and vertical velocity wavefields are transformed from the space-time domain to the wavenumber-frequency domain using a discrete Fourier transform ("DFT") or a fast Fourier transform ("FFT") as represented by $$\sum_{i=1}^{N_s} p(\vec{r}_r, \vec{r}_{si}, t) \to \sum_{i=1}^{N_s} P(k_x, k_y, \omega | z_r, \vec{r}_{si}) \quad (8a)$$

$$\sum_{i=1}^{N_s} v_z(\vec{r}_r, \vec{r}_{si}, t) \to \sum_{i=1}^{N_s} V_z(k_x, k_y, \omega | z_r, \vec{r}_{si}) \quad (8b)$$

where
$k_x$ is the wavenumber in the x-direction; and
$k_y$ is the wavenumber in the y-direction.
The blended upgoing pressure wavefield in the wavenumber-frequency domain is given by $$\sum_{i=1}^{N_s} P^-(k_x, k_y, \omega | z_r, \vec{r}_{si}) = \quad (9)$$

$$\frac{1}{2} \left[ \sum_{i=1}^{N_s} P(k_x, k_y, \omega | z_r, \vec{r}_{si}) - \frac{\omega\rho}{k_z} \sum_{i=1}^{N_s} V_z(k_x, k_y, \omega | z_r, \vec{r}_{si}) \right]$$

where $$k_z = \sqrt{\left(\frac{\omega}{c}\right)^2 - k_x^2 - k_y^2}$$

is the wavenumber in the z-direction.
The blended upgoing pressure wavefield of Equation (9) is transformed from the wavenumber-frequency domain to the space-frequency domain using an inverse DFT or an inverse FFT obtain the blended upgoing pressure wavefield in the space-frequency domain:

$$\sum_{i=1}^{N_s} P^-(k_x, k_y, \omega | z_r, \vec{r}_{si}) \to \sum_{i=1}^{N_s} P^-(\omega, \vec{r}_r | \vec{r}_{si}) \quad (10)$$

Downgoing Vertical Velocity Source Wavefield Modeling

The downgoing vertical velocity source wavefield may be modeled in the space-frequency domain using the following equation:

$$V_{sz}^+(\omega, \vec{r}_{sep} | \vec{r}_s) = V_{szinc}^+(\omega, \vec{r}_{sep} | \vec{r}_s) + V_{szscat}^+(\omega, \vec{r}_{sep} | \vec{r}_s) \quad (11)$$

where $V_{szinc}^+(\omega, \vec{r}_{sep} | \vec{r}_s)$ is the direct incident downgoing vertical velocity source wavefield; and $V_{szscat}^+(\omega, \vec{r}_{sep} | \vec{r}_s)$ is the scattered downgoing vertical velocity source wavefield.

The direct incident downgoing vertical velocity source wavefield may be modeled using notional source signatures by $$V_{szinc}^+(\omega, \vec{r}_{sep} | \vec{r}_s) = i\omega\rho \frac{\partial G_0(\omega, \vec{r}_{sep} | \vec{r}_s)}{\partial z} \sum_{i=1}^{N} s_i(\omega) \quad (12)$$

where $s_i(\omega)$ is the notional source signature of the pressure wavefield generated by the i-th source element of a source;

N is the number of source elements; and $G_0(\omega, \vec{r}_{sep} | \vec{r}_s)$ is a free-space Green's function.

In three-dimensional space, the free-space Green's function is given by $$G_0(\omega, \vec{r}_{sep} | \vec{r}_s) = -\exp(ik|\vec{r}_{sep} - \vec{r}_s|)/4\pi|\vec{r}_{sep} - \vec{r}_s|$$

where k is the wavenumber of the direct incident downgoing vertical velocity source wavefield.

When source elements of a source, such as the source elements of the source 200 in FIG. 2, are activated simultaneously, or close in time, the pressure wavefield generated by each source element is perturbed by the pressure wavefields generated by nearby source elements. A notional source signature is the signature (i.e., acoustic pressure versus time) of a pressure wavefield generated by a source element in the near field of a source without the effects of pressure wavefields created by neighboring source elements of the same source. The notional source signature of each source element may be computed from near field pressure data recorded by pressure sensors located proximate to the source elements and in the near field of the source, as described above with reference to FIG. 2. Computation of the notional source signatures depends on near-field pressure data and on distances between the source elements and the pressure sensors and distances between virtual source elements and the pressure sensors.

Figure 17:
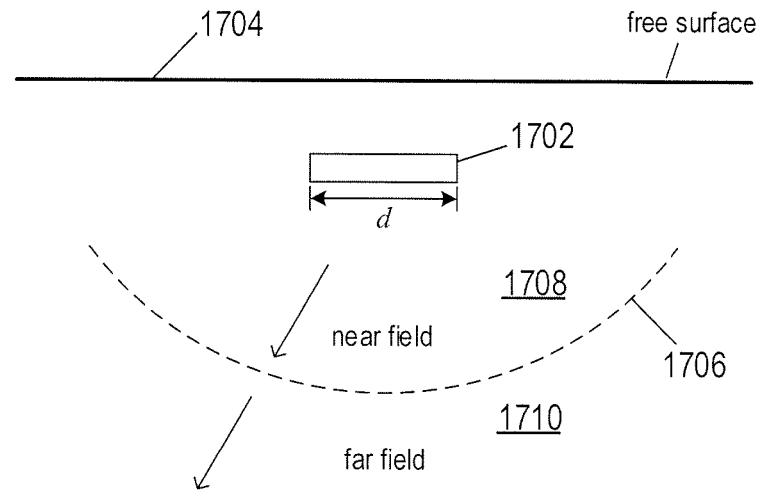
FIG. 17 shows a vertical plane cross sectional view of a near-field region and a far-field region centered at a source.

FIG. 17 shows a vertical plane cross sectional view of a near field region and a far field region surrounding a source 1702 located below the free surface 1704 of a body of water. Activating source elements of the source 1702 creates numerous pressure wavefields that spread out in all directions. The signature of the source wavefield is determined by the overlapping pressure wavefields generated by the source elements. Dashed curve 1706 identifies a spherical-shaped notional boundary between two concentric spherical regions 1708 and 1710 centered at the source 1702. The regions 1708 and 1710 are shown in vertical plane cross section. The inner region 1708 is called the "near field," which represents a region close to the source 1702 where the signature of the source wavefield varies due to numerous overlapping pressure wavefields generated by the source elements of the source 1702. By contrast, the outer region 1710 is called the "far field," which represents a region away from the source 1702 where the signature of the source wavefield settles into an impulsive waveform that decreases in amplitude with increasing distance from the source 1702. The far field region 1706 typically comprises distances greater than about $2d^2/\lambda$ from the center of the source 1702, where d is a length dimension of the source 1702, and $\lambda$ is the wavelength of the source wavefield generated by the source 1702.

Figure 18:
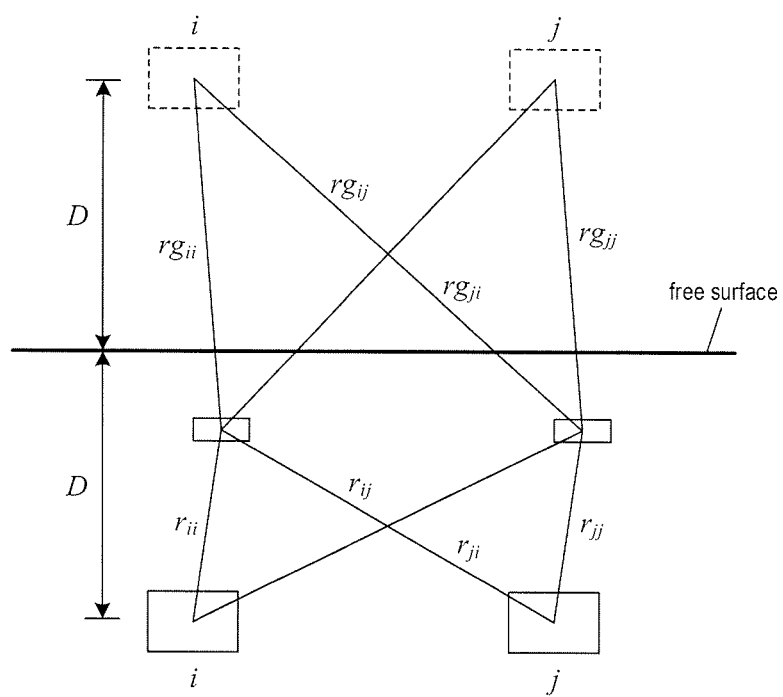
FIG. 18 shows distances between source elements, virtual source elements, and pressure sensors of a source.

FIG. 18 shows distances between source elements, virtual source elements, and pressure sensors of a source. Line 1802 represent a free surface of a body of water, and blocks 1804 and 1806 represent pressure sensors located beneath the free surface. Blocks 1808 and 1810 represent two source elements. Dashed line blocks 1812 and 1814 represent the virtual counterparts of the source elements 1808 and 1810. The source elements 1808 and 1810 are located at a depth D below the free surface 1802, and the virtual source elements 1812 and 1814 are located at a distance −D above the free surface 1802. Lines connecting the blocks represent distances where i is a source element and corresponding virtual source element index, and j is a pressure sensor index. Distances between the source elements 1808 and 1810 and the pressure sensors 1804 and 1806 are denoted by $r_{ij}$. Distances between the virtual source elements 1812 and 1814 and the pressure sensors 1804 and 1806 are denoted by $rg_{ij}$. The distance between each pressure sensor and a corresponding source element of the sources, respectively, is within the near field of the source. For example, the distance between a pressure sensor and a corresponding source element may be about 1 meter. In FIG. 18, the pressure sensor 1804 may be located about 1 meter from corresponding source element 1808 (i.e., $r_{i,j} \approx 1$ meter while $r_{i,j+1} > 1$ meter) and the pressure sensor 1806 may be located about 1 meter from corresponding source element 1810 (i.e., $r_{i+1,j+1} \approx 1$ meter while $r_{i+1,j} > 1$ meter).

The near-field signature output by the j-th pressure sensor of a source element may be represented as the superposition of the notional signatures of the source elements:

$$p_j^{NFS}(t) = \sum_{i=1}^{N} \frac{1}{r_{ij}} s_i\left(t - \frac{r_{ij}}{c}\right) + R \sum_{i=1}^{N} \frac{1}{rg_{ij}} s_i\left(t - \frac{rg_{ij}}{c}\right) \quad (13)$$

where $p_j^{NFS}$ is a near-field signature of the j-th source element as recorded by a corresponding nearest pressure sensor to the j-th source element;

$s_i$ is the notional signature of the i-th source element;

R is the free-surface reflectivity (e.g., R=−1); and

N is the number of source elements.

When the source consists of N pressure sensors and N source elements, there are N independent equations in the form of Equation (13). The N independent equations form a system of N equations with N unknown notional signatures $s_i(t)$. The N independent equations may be solved numerically for the N unknown notional signatures $s_i(t)$. The notional source signatures $s_i(t)$ may be transformed using DFT or FFT from the time domain to the frequency domain to obtain the notional source signature $s_i(w)$ in Equation (12).

The scattered downgoing vertical velocity source wavefield of Equation (11) may be approximate by $$V_{szscat}^+(\omega, \vec{r}_{sep} | \vec{r}_s) \approx \quad (14)$$
$$\sum_{\vec{x}_{sep'} \in S_{sep'}} R_{V_z}(\omega, \vec{r}_{sep} | \vec{r}_{sep'}) P_{inc}(\omega, \vec{r}_{sep'} | \vec{r}_s) \Delta \vec{x}_{sep'}$$

where $P_{inc}(\omega, \vec{r}_{sep'}, \vec{r}_s)$ is the incident pressure wavefield generated by the source at the location $\vec{r}_s$ and virtual receiver at the location $\vec{r}_{sep'}$ of a second separation level $S_{sep'}$; and $$R_{V_z}(\omega, \vec{r}_{sep} | \vec{r}_{sep'}) \approx \frac{1}{(2\pi)^4}$$ (15)

$$\sum_{\vec{k}^{sep'} \in S_{sep'}} \sum_{\vec{k}^{sep} \in S_{sep}} [e^{-ik_z^{sep'} z_{sep'}} R_{coef}(\omega, \vec{k}^{sep} | \vec{k}^{sep'}) e^{ik_z^{sep} z_{sep}}] \times$$

$$e^{i[k_z^{sep'} z_{sep'} + k_z^{sep} z_{sep}]} \frac{k_z^{sep}}{\omega \rho} \Delta \vec{k}^{sep'} \Delta \vec{k}^{sep}$$

where $\vec{k}^{sep}$ is the wavevector at the separation level $S_{sep}$;

$\vec{k}^{sep'}$ is the wavevector at the second separation level $S_{sep'}$;

$\vec{k}_{dz} = \vec{k}^{sep} - \vec{k}^{sep'}$;

$k_{dz} = k^{sep} - k^{sep'}$;

$k_z^{sep}$ is the wavenumber at the separation level $S_{sep}$ in the z-direction; and $k_z^{sep'}$ is the wavenumber at the separation level $S_{sep'}$ in the z-direction.

The second separation level $S_{sep'}$ is located at depth between the sources and the free surface in the same manner as the separation level $S_{sep}$. The wavefield $R_{V_z}(\omega, \vec{r}_{sep} | \vec{r}_{sep'})$ is an extrapolated obliquity correction wavefield of the plane wave reflection coefficient $R_{coef}(\omega, \vec{k}^{sep} | \vec{k}^{sep'})$ The incident pressure wavefield $P_{inc}(\omega, \vec{r}_{sep'}, \vec{r}_s)$ in Equation (14) may be computed from the notional signatures. Let $\vec{r}_{sep'} = (x_P, y_P, z_P)$ represent a location on the second separation level $S_{sep'}$. The incident pressure wavefield in the far field is given by:

$$p_{inc}(\vec{r}_{sep'}, \vec{r}_s, t) = \sum_{i=1}^{N} \frac{1}{r_{iP}} s_i\left(t - \frac{r_{iP}}{c}\right)$$ (16)

where $r_{iP}$ is the distance from the location of the i-th source to the location $\vec{r}_P$ in the far field.

The incident pressure wavefield $p_{inc}(\vec{r}_{sep'}, \vec{r}_s, t)$ may be transformed from the space-time domain to the space-frequency domain using DFT or FFT to obtain the incident pressure wavefield $P_{inc}(\omega, \vec{r}_{sep'}, \vec{r}_s)$ The plane wave reflection coefficient $R_{coef}(\omega, \vec{k}^{sep} | \vec{k}^{sep'})$ in Equation (15) represents the reflectivity of the free surface at mean sea level. When the seismic data is recorded in calm free surface conditions (e.g., wave heights less than about half a meter), the plane wave reflection coefficient may be set to $|R_{coef}(\omega, \vec{k}^{sep} | \vec{k}^{sep'})| \leq 1$ (i.e., a flat free surface approximation). When seismic data is recorded in rough free surface conditions (e.g., wave heights greater than about half a meter), the plane wave reflection coefficient may be estimated based on a stochastic representation of the free surface conditions. The plane wave reflection coefficient may be decomposed into coherent and incoherent components:

$$R_{coef}(\omega, \vec{k}^{sep} | \vec{k}^{sep'}) = R_{coh}(\omega, \vec{k}^{sep} | \vec{k}^{sep'}) + R_{incoh}(\omega, \vec{k}^{sep} | \vec{k}^{sep'})$$ (17)

The coherent component $R_{coh}(\omega, \vec{k}^{sep} | \vec{k}^{sep'})$ represents the mean of the plane wave reflection coefficient. The incoherent component $R_{incoh}(\omega, \vec{k}^{sep} | \vec{k}^{sep'})$ represents the reflection coefficient of the fluctuating scattered wavefield created by the free surface. For a rough free surface with measured wave height variation that follows a Gaussian distribution with zero mean free surface level and a non-zero wave height standard deviation, $\sigma$, the coherent component at the mean free surface level may be analytically approximated by:

$$R_{coh}^{KA}(\omega, \vec{k}^{sep} | \vec{k}^{sep'}) = -\exp\{-2[k_z^r \sigma]^2\} \delta(\vec{k}^{sep} | \vec{k}^{sep'})$$ (18)

and, the incoherent component may be analytically approximated by:

$$R_{incoh}^{KA}(\omega, \vec{k}^{sep} | \vec{k}^{sep'}) \approx$$ (19)

$$\sqrt{\frac{1}{2\pi}\left[\frac{k_{dz}k_z^{sep} - k_{dz}k_z^{sep'}}{k_z^{sep'} k_{dz}}\right]^2 \times}$$

$$\sqrt{\sum_{\vec{x}} \Delta \vec{x} \exp\{\vec{k}_{dz} \cdot \vec{x}\} \left[\exp\{-\sigma^2 \vec{k}_{dz}^2\}[1 - C(\vec{x})] - \exp\{-[k_{dz}\sigma]^2\}\right]}$$

where superscript KA denotes a Kirchhoff approximation;

$k_z^r$ is wavenumber in the z-direction;

$\vec{k}^{sep'}$ is the wavevector at the separation level $S_{sep}$;

$\vec{k}^{sep'}$ is the wavevector at the second separation level $S_{sep'}$;

$\delta(\bullet)$ is the Dirac delta operator;

$\vec{k}_{dz} = \vec{k}^{sep} - \vec{k}^{sep'}$;

$k_{dz} = k_{sep} - k_{sep'}$; and $C(\vec{x})$ is a free surface correlation function.

The analytical coherent and incoherent components are Kirchhoff approximations of the coherent and incoherent plane wave reflection coefficient at the mean free surface level.

Figure 19:
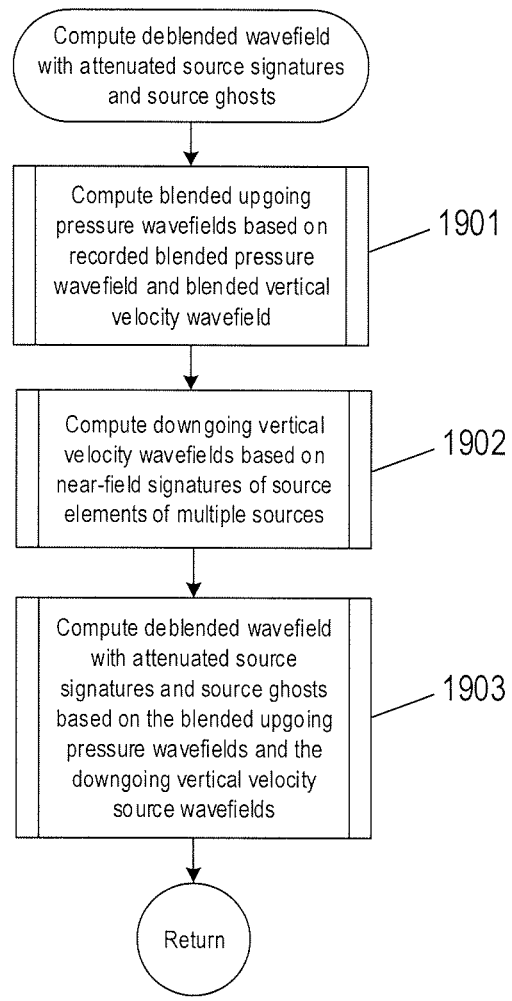
FIG. 19 is a flow diagram illustrating an example implementation of the "compute deblended wavefield with attenuated source signatures and source ghosts" step referred to in FIG. 6.

FIG. 19 is a flow diagram illustrating an example implementation of the "compute deblended wavefield with attenuated source signatures and source ghosts" step referred to in block 603 of FIG. 6. In block 1901, a "compute blended upgoing pressure wavefields based on recorded blended pressure wavefield and blended vertical velocity wavefield" procedure is performed. In block 1902, a "compute downgoing vertical velocity wavefields based on near-field signatures of source elements of the multiple sources" procedure is performed. In block 1903, a "compute deblended wavefield with attenuated source signatures and source ghosts based on the blended upgoing pressure wavefields and the downgoing vertical velocity source wavefields" procedure is performed.

Figure 20:
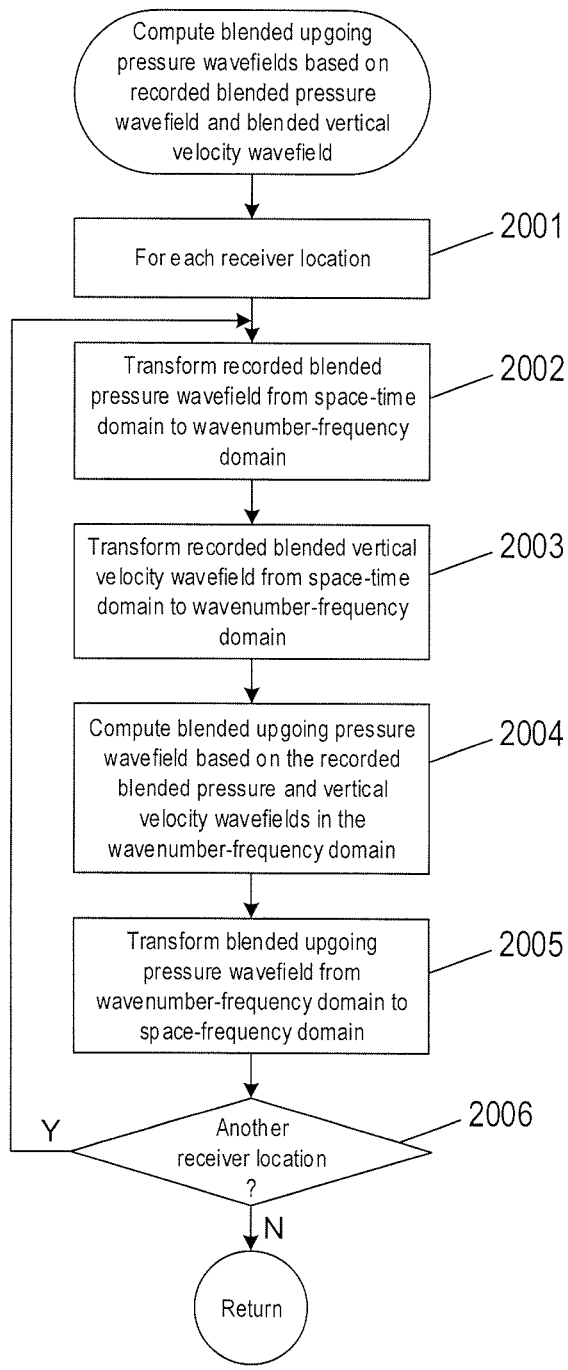
FIG. 20 is a flow diagram illustrating an example implementation of the "compute blended upgoing pressure wavefields based on recorded blended pressure wavefield and blended vertical velocity wavefield" step referred to in FIG. 19.

FIG. 20 is a flow diagram illustrating an example implementation of the "compute blended upgoing pressure wavefields based on recorded blended pressure wavefield and blended vertical velocity wavefield" step referred to in bock 1901 of FIG. 19. A loop beginning with block 2001 repeats the computational operations represented by blocks 2002-2005 for each receiver. In block 2002, the recorded blended pressure wavefield is transformed from the space-time domain to the wavenumber-frequency domain, as described above with reference to Equation (8a). In block 2003, the recorded blended vertical velocity wavefield is transformed from the space-time domain to the wavenumber-frequency domain, as described above with reference to Equation (8b). In block 2004, blended upgoing pressure wavefield at the receiver location is computed based on the blended pressure wavefield and the vertical velocity data in the wavenumber-frequency domain. In block 2005, the blended upgoing pressure wavefield is transformed to the space-frequency domain. In decision block 2006, the computational operations of blocks 2002-2005 are repeated for another receiver location.

Figure 21:
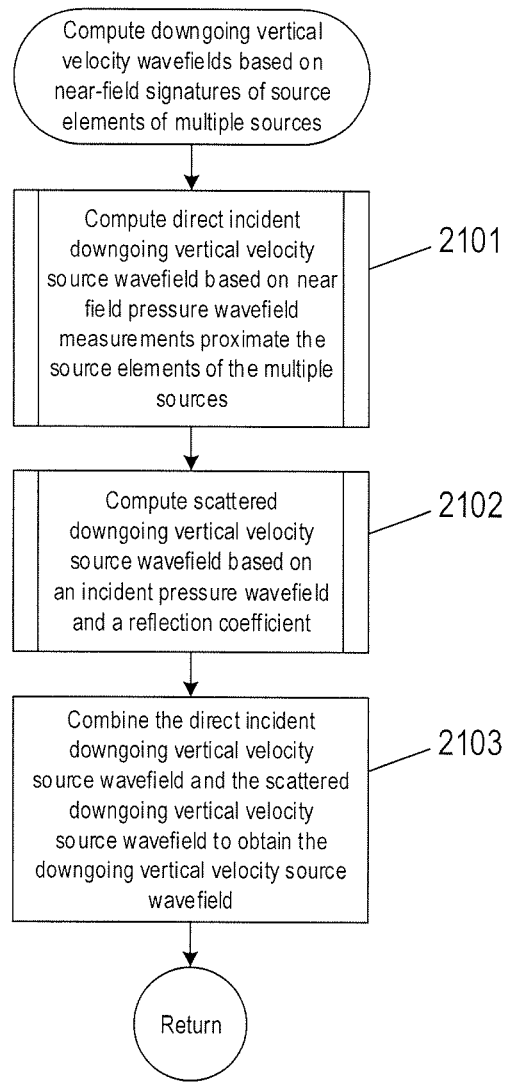
FIG. 21 is a flow diagram of the "compute downgoing vertical velocity wavefields based on near-field signatures of source elements of the multiple sources" step referred to in FIG. 19.

FIG. 21 is a flow diagram of the "compute downgoing vertical velocity wavefields based on near-field signatures of source elements of the multiple sources" step referred to in block 1902 of FIG. 19. In block 2101, a "compute direct incident downgoing vertical velocity source wavefield based on near field pressure wavefield measurements proximate the source elements of the multiple sources" procedure is performed. In block 2102, a "compute scattered downgoing vertical velocity source wavefield based on an incident pressure wavefield and a reflection coefficient" procedure is performed. In block 2103, the direct incident downgoing vertical velocity source wavefield and the scattered downgoing vertical velocity source wavefield are combined to obtain the downgoing vertical velocity wavefields, as described above with reference to Equation (11).

Figure 22:
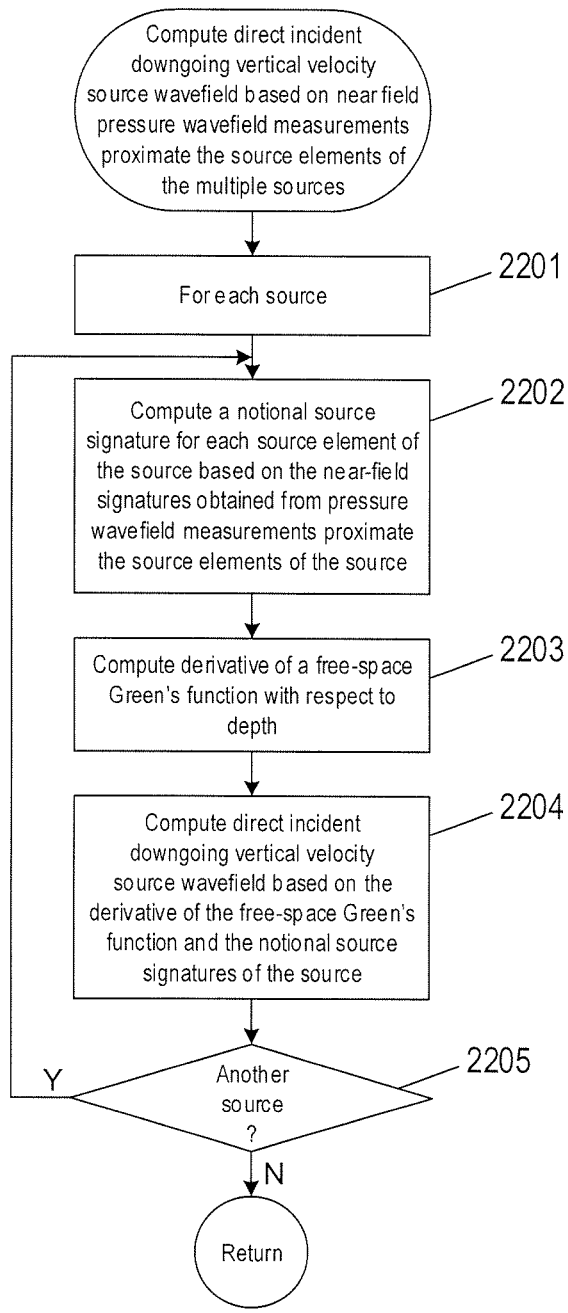
FIG. 22 is a flow diagram of the "compute direct incident downgoing vertical velocity source wavefield based on near field pressure wavefield measurements proximate the source elements of the multiple sources" step referred to in FIG. 21.

FIG. 22 is a flow diagram of the "compute direct incident downgoing vertical velocity source wavefield based on near field pressure wavefield measurements proximate the source elements of the multiple sources" step referred to in block 2101 of FIG. 21. A loop in block 2201 repeats the computational operations of blocks 2202-2205 for each of the multiple sources. In block 2202, a notional source signature is computed for each source element of the source based on the near-field signatures obtained from pressure wavefield measurements proximate the source elements of the source. In block 2203, compute derivative of a free-space Green's functions with respect to depth, as described above with reference to Equation (12). In block 2204, compute direct incident downgoing vertical velocity wavefield based on the derivative of the free-space Green's function and the notional source signatures of the source. In decision block 2205, the computational operations of blocks 2202-2204 are repeated for another source.

Figure 23:
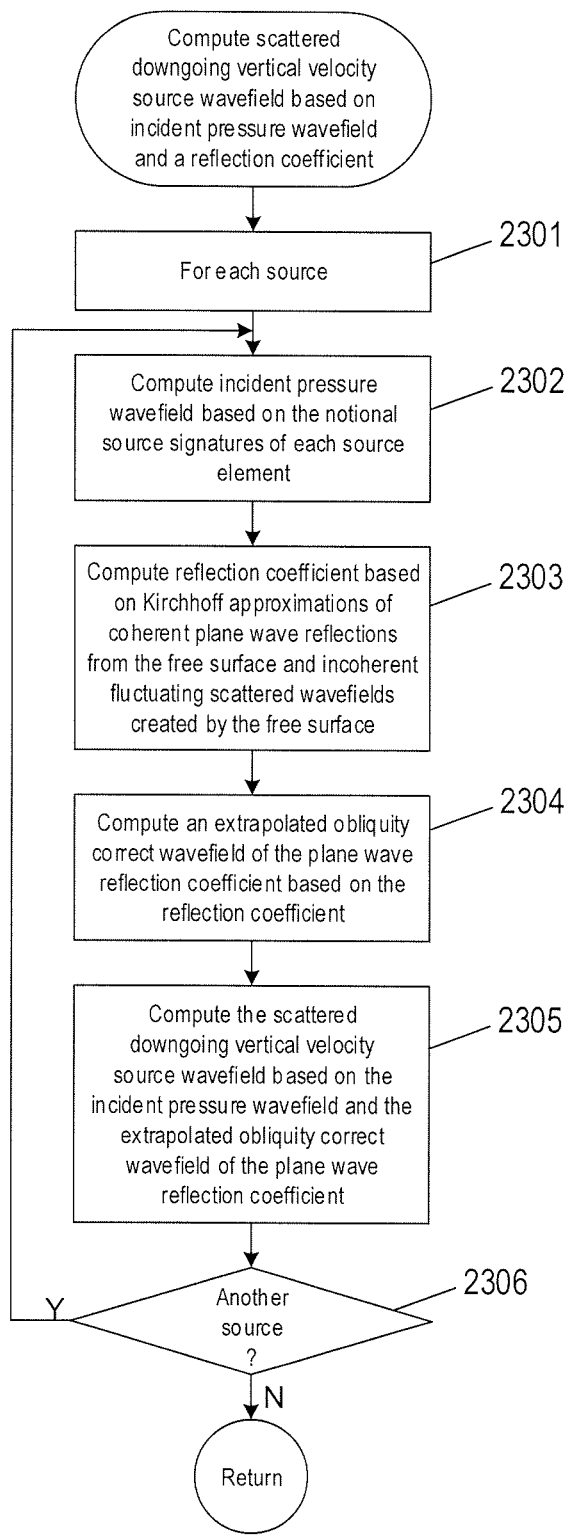
FIG. 23 is a flow diagram of the "compute scattered downgoing vertical velocity source wavefield based on an incident pressure wavefield and a reflection coefficient" step referred to in FIG. 21.

FIG. 23 is a flow diagram of the "compute scattered downgoing vertical velocity source wavefield based on an incident pressure wavefield and a reflection coefficient" step referred to in block 2102 of FIG. 21. A loop beginning with block 2301 repeats the computational operations represented by block 2302-2305 for each source. In block 2302, an incident pressure wavefield is computed based on the notional source signatures of each source element, as described above with reference to Equation (16). In block 2303, a reflection coefficient is computed as represented by Equation (17) based on a Kirchhoff approximation of coherent plane wave reflections from the free surface of the body of water of Equation (18) and a Kirchhoff approximation of incoherent fluctuating scattered wavefields create by the free surface of Equation (19). In block 2304, an extrapolated obliquity correction wavefield of the plane wave reflection coefficient is computed based on the reflection coefficient, as described above with reference to Equation (15). In block 2305, the scattered downgoing vertical velocity source wavefield is computed based on the incident pressure wavefield and the extrapolated obliquity correction wavefield as described above with reference to Equation (14).

Figure 24:
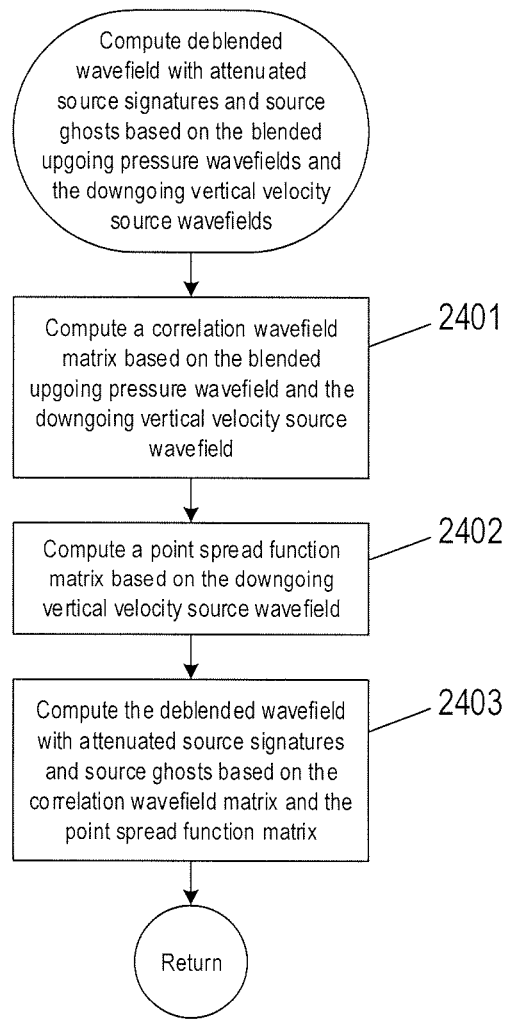
FIG. 24 is a flow diagram of the "compute deblended wavefield with attenuated source signatures and source ghosts based on the blended upgoing pressure wavefields and the downgoing vertical velocity source wavefields" step referred to in FIG. 19.

FIG. 24 is a flow diagram of the "compute deblended wavefield with attenuated source signatures and source ghosts based on the blended upgoing pressure wavefields and the downgoing vertical velocity source wavefields" step referred to in block 1903 of FIG. 19. In block 2401, a correlation wavefield matrix is computed based on the blended upgoing pressure wavefields and the downgoing vertical velocity source wavefields, as described above with reference to Equation (5b) and FIG. 16. In block 2402, a point spread function matrix is computed based on the downgoing vertical velocity source wavefields, as described above with reference to Equation (5c) and FIG. 16. In block 2402, deblended wavefield with attenuated source signatures and source ghosts is computed based on the correlation wavefield matrix and the point spread function matrix as described above with reference to Equation (7).

Figure 25:
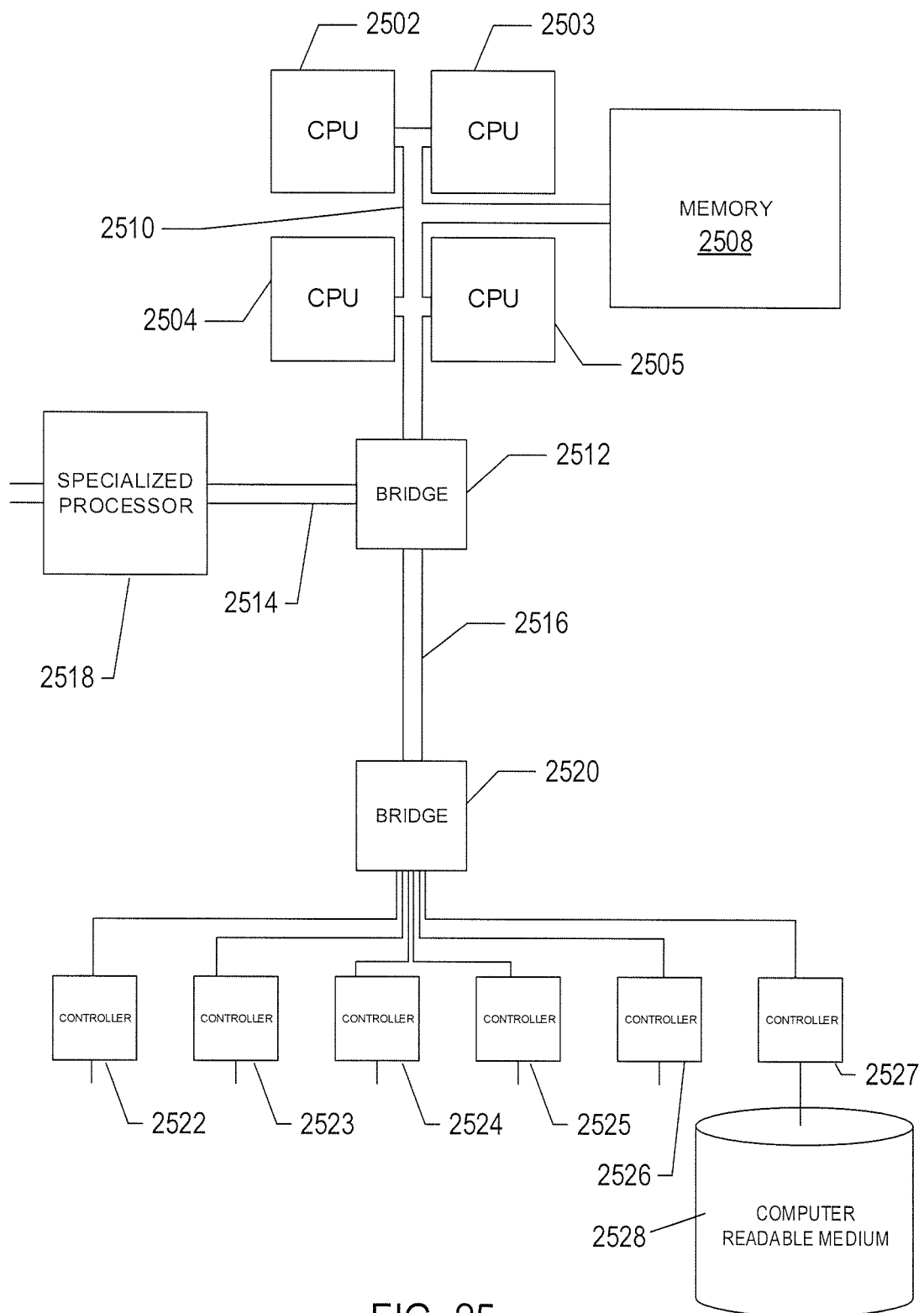
FIG. 25 is an example computer system that may be used to execute an efficient process for generating an image of a subterranean formation.

FIG. 25 shows an example computer system that may be used to execute an efficient process for generating an image of subterranean formation and therefore represents a geophysical-analysis data-processing system. The internal components of many small, mid-sized, and large computer systems as well as specialized processor-based storage systems can be described with respect to this generalized architecture, although each system may feature many additional components, subsystems, and similar, parallel systems with architectures similar to this generalized architecture. The computer system contains one or multiple central processing units ("CPUs") 2502-2505, one or more electronic memories 2508 interconnected with the CPUs by a CPU/memory-subsystem bus 2510 or multiple busses, a first bridge 2512 that interconnects the CPU/memory-subsystem bus 2510 with additional busses 2514 and 2516, or other types of high-speed interconnection media, including multiple, high-speed serial interconnects. The busses or serial interconnections, in turn, connect the CPUs and memory with specialized processors, such as a graphics processor 2518, and with one or more additional bridges 2520, which are interconnected with high-speed serial links or with multiple controllers 2522-2527, such as controller 2527, that provide access to various different types of computer-readable media, such as computer-readable medium 2528, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 2528 is a data-storage device, including electronic memory, optical or magnetic disk drive, a magnetic tape drive, USB drive, flash memory and other such data-storage device. The computer-readable medium 2528 can be used to store machine-readable instructions that encode the computational methods described above and can be used to store encoded data, during store operations, and from which encoded data can be retrieved, during read operations, by computer systems, data-storage systems, and peripheral devices.

The processes and systems disclosed herein may be used to manufacture a geophysical data product indicative of certain properties of a subterranean formation. A geophysical data product may be manufactured by using the processes and systems described herein to generate geophysical data and storing the geophysical data in a computer-readable medium 2528. The geophysical data may be pressure data, vertical velocity data, upgoing and downgoing wavefields, deblended wavefield with attenuated source ghost and source signature, and any image of a subterranean formation computed using the processes and systems described herein. The geophysical data product may be produced offshore (i.e., by equipment on the survey vessel 102) or onshore (i.e., at a computing facility on land), or both.

Simulation Results

Figure 26:
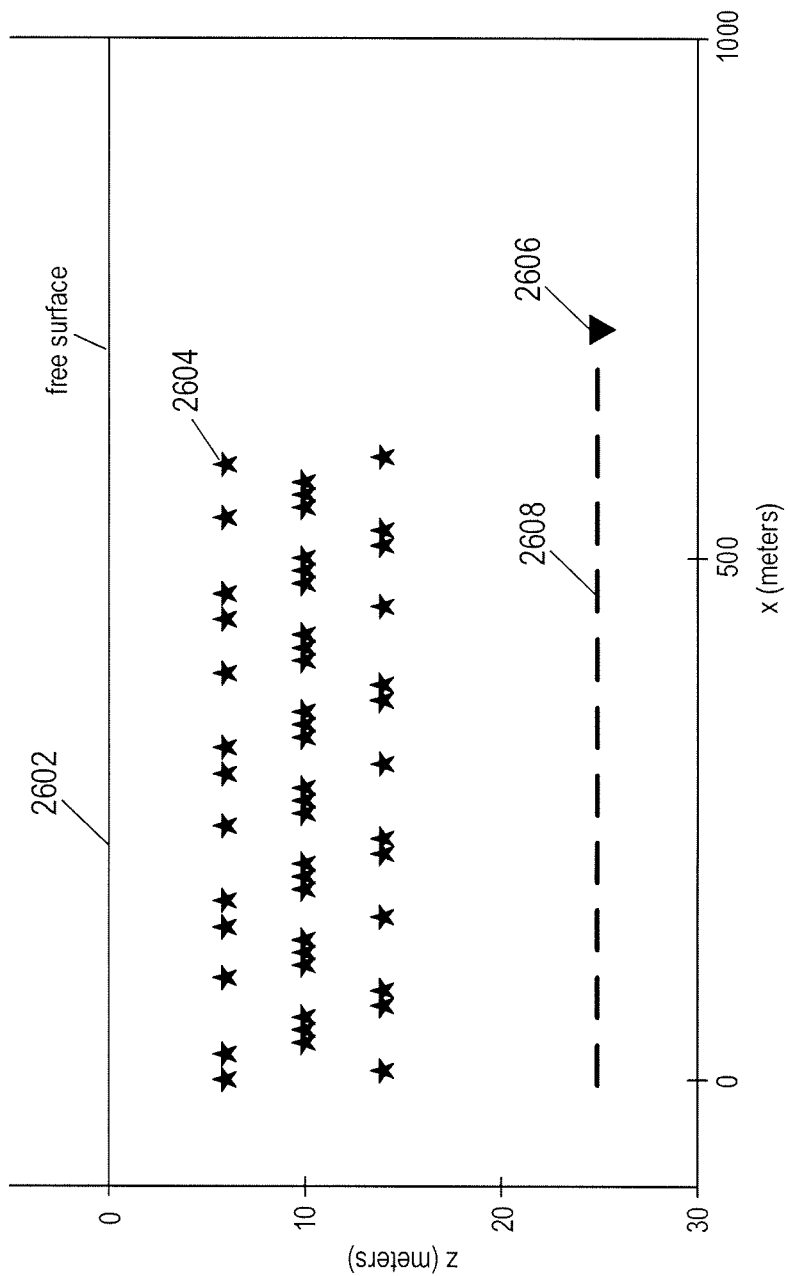
FIGS. 26-31B show simulation results obtained by using the processes and systems described herein.
Figure 27B:
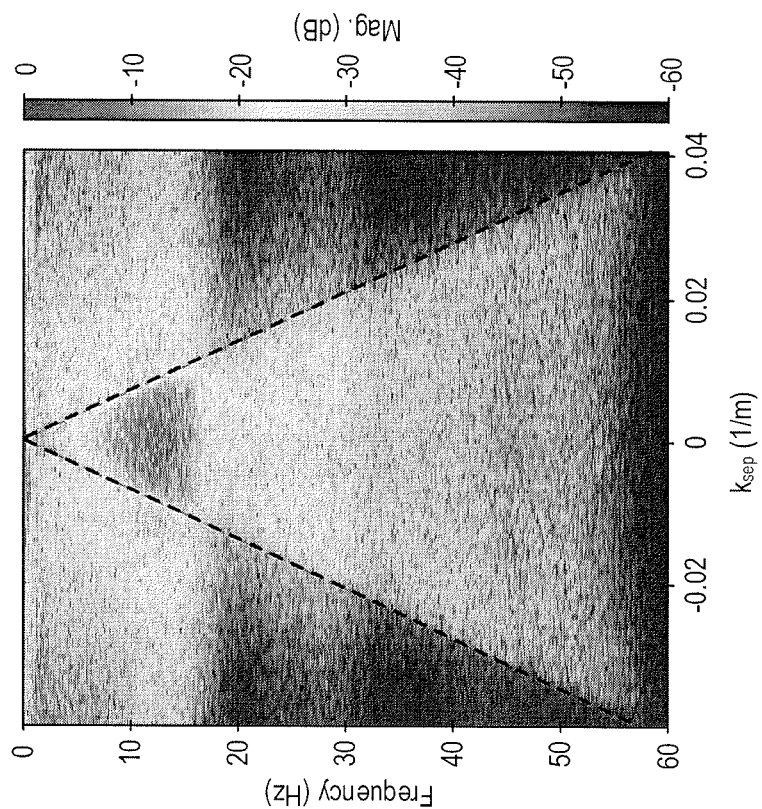
Figure 27A:
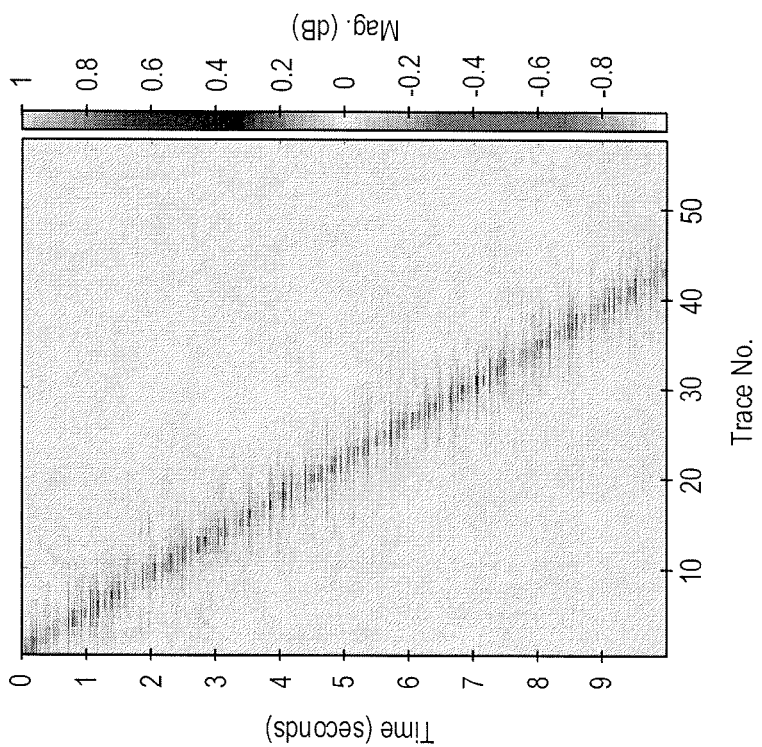
Figure 28B:
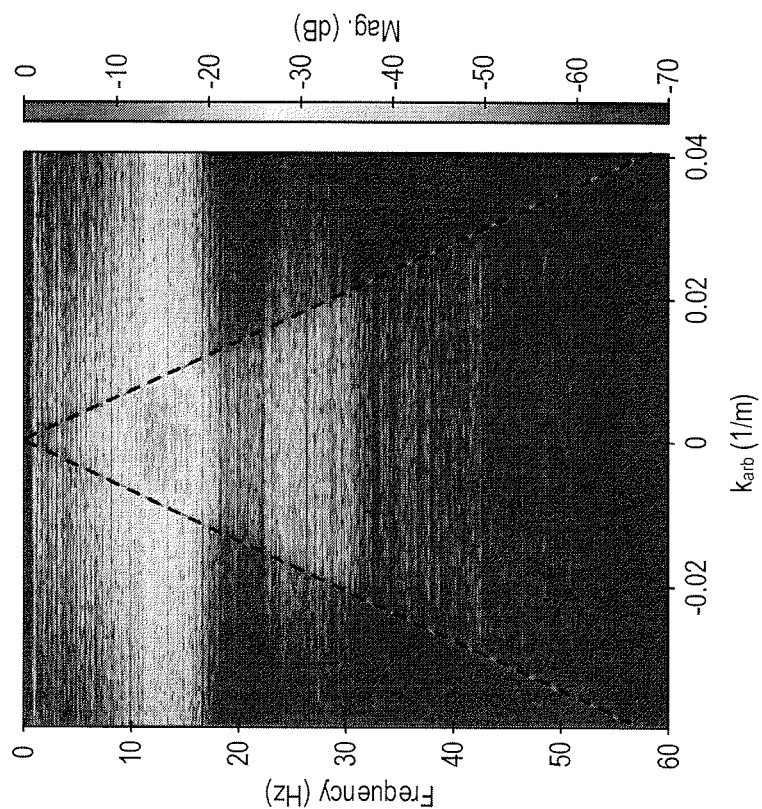
Figure 28A:
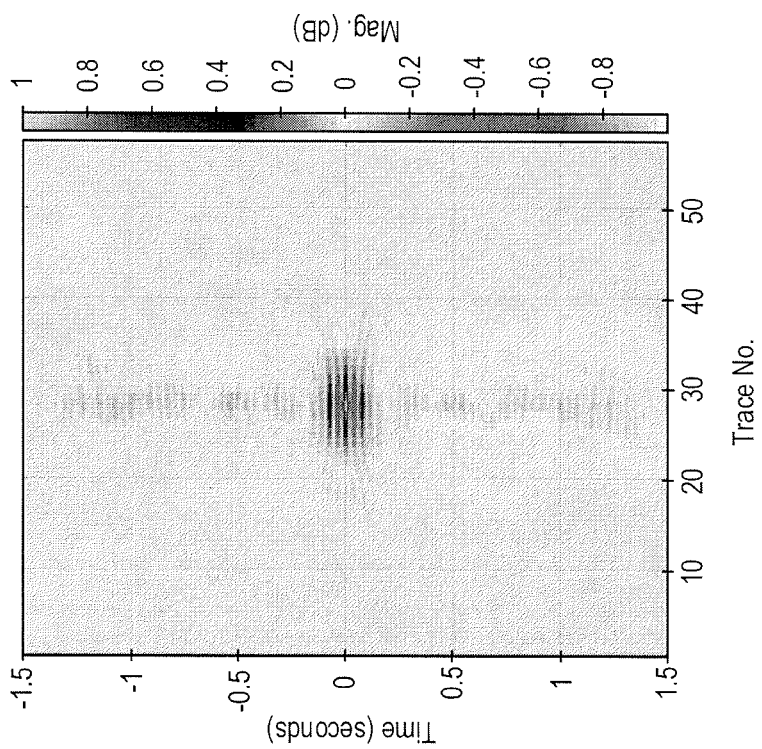
Figure 29B:
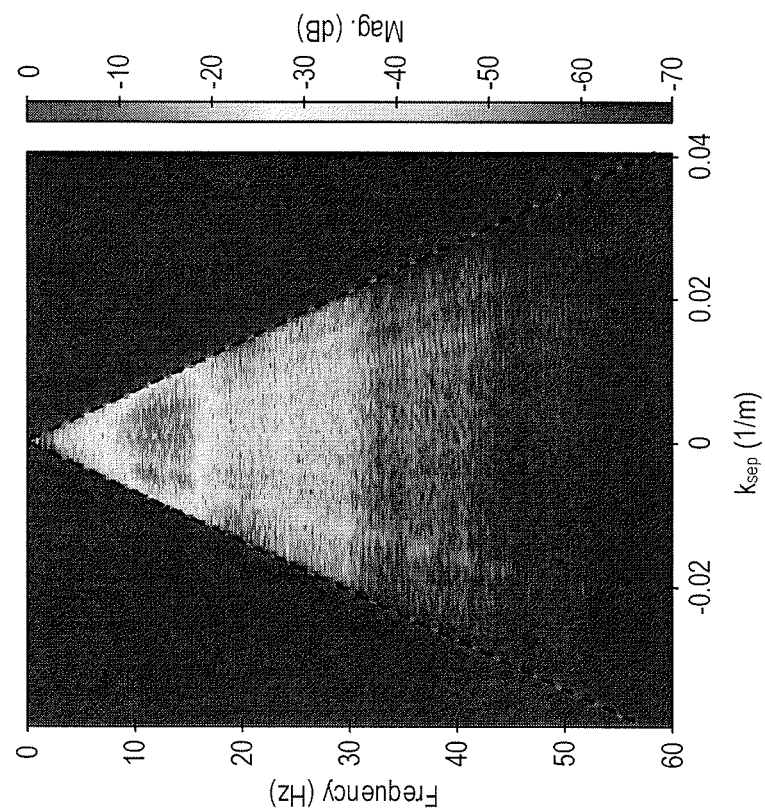
Figure 29A:
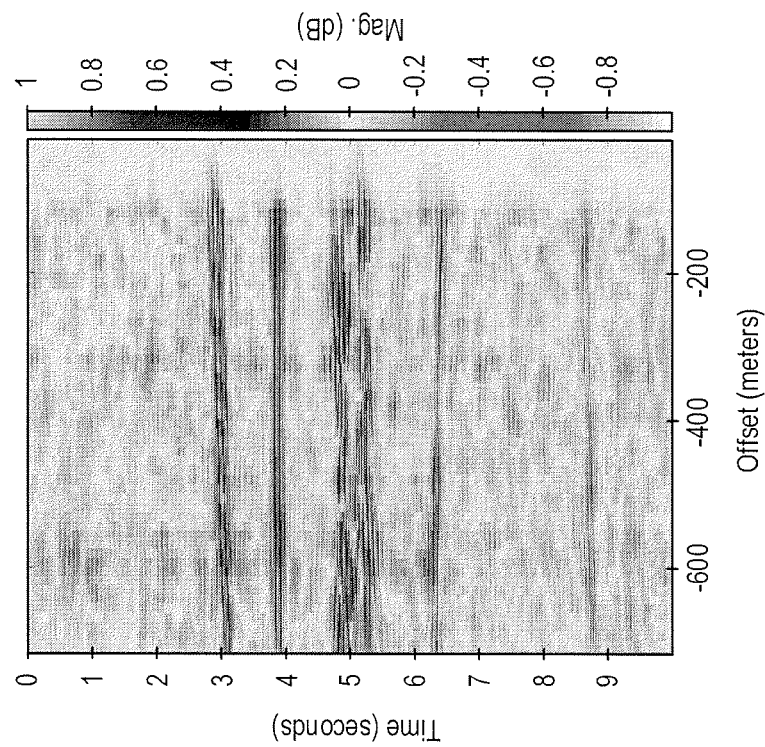
Figure 30A:
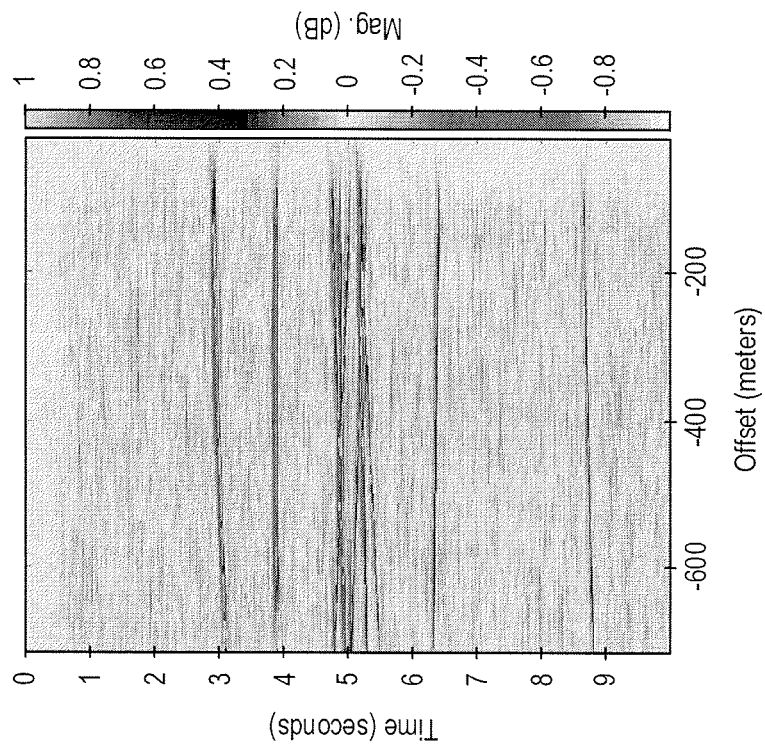
Figure 30B:
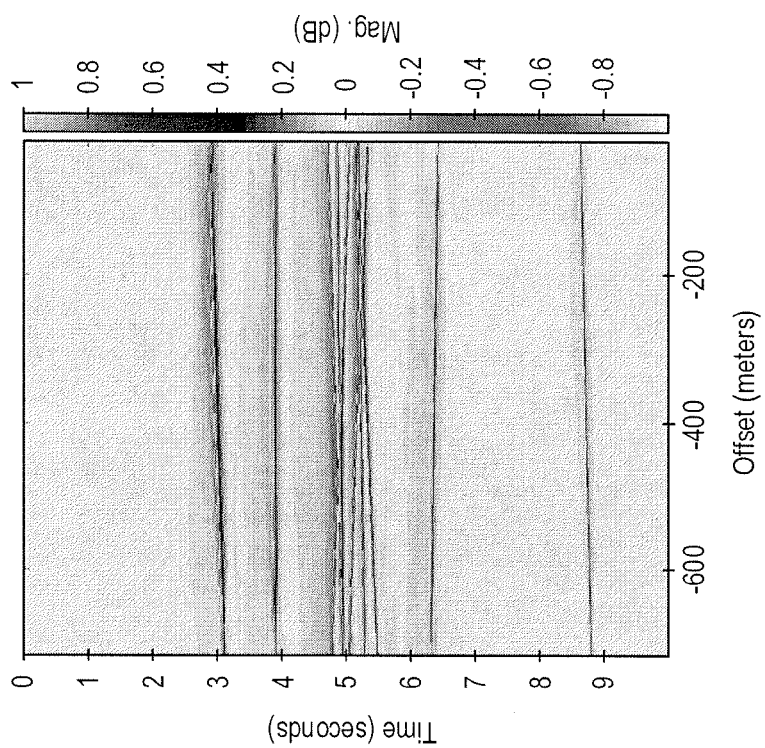
Figure 31B:
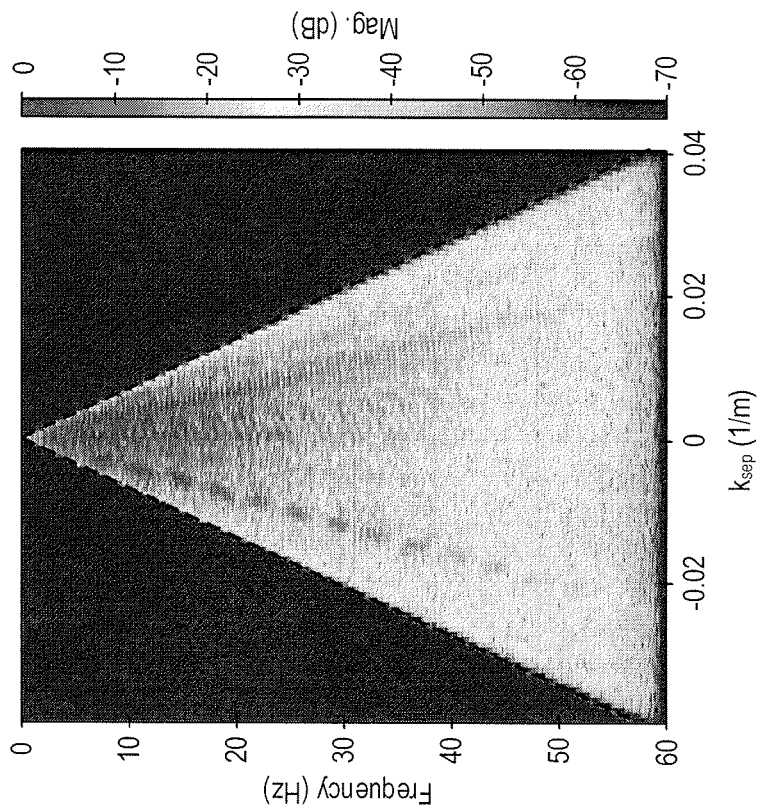
Figure 31A:
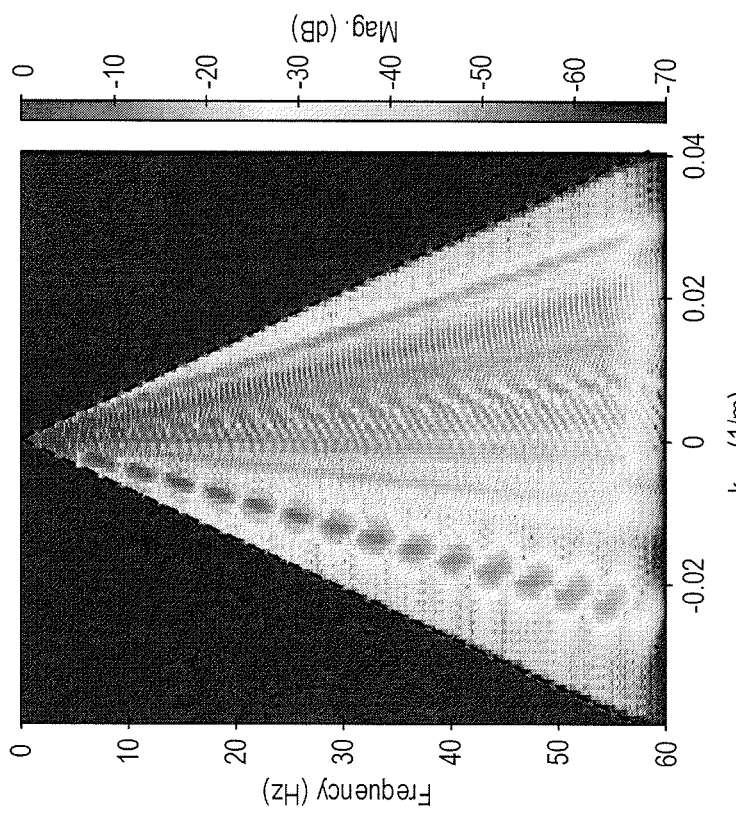

FIG. 26 shows a vertical plane cross section of a two-dimensional seismic data acquisition system for a flat free surface 2602 used to generate the results shown in subsequent FIGS. 27-31. Stars, such as star 2604, identify the locations of sources. Triangle 1606 represents the location of a receiver 2606. Heavy dashed line 2608 represents the location of a separation level $S_{sep}$ and the location of an intermediate level $S_{arb}$ with the same depth below the free surface 2602. FIGS. 27A and 27B show the downgoing vertical velocity source wavefield in the space-time domain and the wavenumber-frequency domain, respectively. The separation level and the intermediate level were assigned the same depth and used to compute the point spread function. FIGS. 28A and 28B show the point spread function for a single location in the separation level in the space-time domain and in wavenumber-frequency domain, respectively. The correlated wavefield was computed using the upgoing pressure wavefield and the complex conjugate transpose of the downgoing vertical velocity source wavefield, as described above with reference Equation (8a). FIGS. 29A and 29B show the correlated wavefield in the space-time domain and the wavenumber-frequency domain, respectively. In certain seismic data acquisitions, the point spread function may be a band limited spike and the correlated wavefield matches the deghosted and designatured wavefield in time. FIGS. 30A and 30B show corresponding modelled and deblended wavefield with attenuated source signatures and source ghosts in the space-time domain. FIGS. 31A and 31B show corresponding modelled and deblended wavefield with attenuated source signatures and source ghosts in the wavenumber-frequency domain.

It is appreciated that the previous description of the disclosed embodiments is provided to enable any person skilled in the art to make or use the present disclosure. Various modifications to the embodiments will be apparent to those skilled in the art, and the generic principles defined herein may be applied to other embodiments without departing from the spirit or scope of the disclosure. Thus, the present disclosure is not intended to be limited strictly to the embodiments shown herein but is to be accorded the widest scope consistent with the principles and novel features disclosed herein.

The invention claimed is:

1. In a process for generating an image of a subterranean formation using marine seismic techniques in which sources are activated in a body of water above the subterranean formation and receivers located in the body of water to record overlapping reflected wavefields from the subterranean formation as a blended pressure wavefield and a blended vertical velocity wavefield in a data-storage device, the specific improvement comprising:
computing blended upgoing pressure wavefield based on the recorded blended pressure wavefield and the recorded blended vertical velocity wavefield;
computing downgoing vertical velocity wavefield based on near-field signatures of source elements of the multiple sources;
computing deblended wavefield based on the blended upgoing pressure wavefield and the downgoing vertical velocity source wavefield; and
generating an image of the subterranean formation based at least in part on the deblended wavefield, thereby enhancing resolution of the image by using the deblended wavefield with attenuated source signatures and source ghosts.

2. The process of claim 1 wherein computing the blended upgoing pressure wavefield based on the recorded blended pressure and the recorded blended vertical velocity comprises:
for each receiver location
transforming the blended pressure wavefield from the space-time domain to the wavenumber-frequency domain;
transforming the blended vertical velocity wavefield from the space-time domain to the wavenumber-frequency domain;
computing the blended upgoing pressure wavefield based on the blended pressure wavefield and blended vertical velocity wavefield; and
transforming the blended upgoing pressure wavefield to the space-frequency domain.

3. The process of claim 1 wherein computing the downgoing vertical velocity wavefield comprises:
computing a direct incident downgoing vertical velocity source wavefield based on near field pressure wavefield measurements proximate the source elements of the multiple sources;
computing scattered downgoing vertical velocity source wavefield based on an incident pressure wavefield and a reflection coefficient; and
combining the direct incident downgoing vertical velocity source wavefield with the scattered downgoing vertical velocity source wavefield to obtain the downgoing vertical velocity wavefield.

4. The process of claim 3, wherein computing the direct incident downgoing vertical velocity source wavefield comprises:
for each source of the sources
computing a notional source signature for each source element of the source based on the near-field signatures obtained from the pressure wavefield measurements proximate the source elements of the source;
computing a derivative of a free-space Green's functions with respect to depth; and
computing the direct incident downgoing vertical velocity wavefield based on the derivative of the free-space Green's function and the notional source signatures of the source.

5. The process of claim 3, wherein computing the scattered downgoing vertical velocity source wavefield comprises:
for each source of the multiple sources
computing an incident pressure wavefield based on the notional source signatures of each source element;
computing a reflection coefficient based on a Kirchhoff approximation of coherent plane wave reflections from the free surface of the body of water and a Kirchhoff approximation of incoherent fluctuating scattered wavefields create by the free surface;
computing an extrapolated obliquity correction wavefield of the plane wave reflection coefficient based on the reflection coefficient; and computing the scattered downgoing vertical velocity source wavefield based on the incident pressure wavefield and the extrapolated obliquity correction wavefield.

6. The process of claim 1 wherein computing deblended wavefield comprises:
    computing matrix elements of a correlation wavefield matrix based on the blended upgoing pressure wavefields and the downgoing vertical velocity source wavefields;
    computing elements of a point spread function matrix based on the downgoing vertical velocity source wavefields; and
    computing a deblended wavefield matrix with attenuated source signatures and source ghosts based on the correlation wavefield matrix and the point spread function matrix.

7. A computer system for computing an image of a subterranean formation from a recorded blended pressure wavefield and blended vertical velocity wavefield obtained in a marine survey of the subterranean formation, the system comprising:
    one or more processors;
    one or more data-storage devices; and
    machine-readable instructions stored in the one or more data-storage devices that when executed using the one or more processors controls the system to perform the operations comprising:
        computing a blended upgoing pressure wavefield based on the blended pressure wavefield and the blended vertical velocity wavefield;
        computing downgoing vertical velocity wavefield based on notional source signatures of source elements of multiple sources activated in the marine survey;
        computing deblended wavefield with attenuated source signatures and source ghosts based on the blended upgoing pressure wavefield and the downgoing vertical velocity source wavefield; and
        generating an image of the subterranean formation based at least in part on the deblended wavefield.

8. The computer system of claim 7 wherein computing the blended upgoing pressure wavefield based on the recorded blended pressure wavefield and the recorded blended vertical velocity wavefield comprises:
    for each receiver location
        transforming the blended pressure wavefield from the space-time domain to the wavenumber-frequency domain;
        transforming the blended vertical velocity wavefield from the space-time domain to the wavenumber-frequency domain;
        computing the blended upgoing pressure wavefield based on the blended pressure wavefield and the blended vertical velocity wavefield; and
        transforming the blended upgoing pressure wavefields to the space-frequency domain.

9. The computer system of claim 7 wherein computing the downgoing vertical velocity wavefield comprises:
    computing a direct incident downgoing vertical velocity source wavefield based on the notional source signatures of the source elements;
    computing a scattered downgoing vertical velocity source wavefield based on an incident pressure wavefield and a reflection coefficient; and
    combining the direct incident downgoing vertical velocity source wavefield with the scattered downgoing vertical velocity source wavefield to obtain the downgoing vertical velocity wavefield.

10. The computer system of claim 9, wherein computing the direct incident downgoing vertical velocity source wavefield comprises:
    for each source of the multiple sources
        computing the notional source signature of each source element of the source based on near-field pressure wavefield measurements proximate the source elements of the source;
        computing a derivative of a free-space Green's functions with respect to depth; and
        computing the direct incident downgoing vertical velocity wavefield based on the derivative of the free-space Green's function and the notional source signatures of the source.

11. The computer system of claim 9, wherein computing the scattered downgoing vertical velocity source wavefield comprises:
    for each source of the multiple sources
        computing an incident pressure wavefield based on the notional source signatures of each source element;
        computing a reflection coefficient based on a Kirchhoff approximation of coherent plane wave reflections from the free surface of the body of water and a Kirchhoff approximation of incoherent fluctuating scattered wavefields created by the free surface;
        computing an extrapolated obliquity correction wavefield of the plane wave reflection coefficient based on the reflection coefficient; and
        computing the scattered downgoing vertical velocity source wavefield based on the incident pressure wavefield and the extrapolated obliquity correction wavefield.

12. The computer system of claim 7 wherein computing deblended wavefield comprises:
    computing matrix elements of a correlation wavefield matrix based on the blended upgoing pressure wavefields and the downgoing vertical velocity source wavefields;
    computing elements of a point spread function matrix based on the downgoing vertical velocity source wavefields; and
    computing a deblended wavefield matrix with attenuated source signatures and source ghosts based on the correlation wavefield matrix and the point spread function matrix.

13. A non-transitory computer-readable medium encoded with machine-readable instructions that implement a method performed by one or more processors of a computer system to perform operations comprising:
    computing blended upgoing pressure wavefield based on a blended pressure wavefield and a blended vertical velocity wavefield recorded in a marine survey of a subterranean formation;
    computing downgoing vertical velocity wavefield based on near-field pressure wavefields generated by source elements of sources activated in the marine survey;
    computing deblended wavefield with attenuated source signatures and source ghosts based on the blended upgoing pressure wavefield and the downgoing vertical velocity source wavefield; and
    generating an image of the subterranean formation based at least in part on the deblended wavefield.

14. The medium of claim 13 wherein computing the blended upgoing pressure wavefield based on the recorded blended pressure wavefield and the recorded blended vertical velocity wavefield comprises:
for each receiver location
transforming the blended pressure wavefield from the space-time domain to the wavenumber-frequency domain;
transforming the blended vertical velocity wavefield from the space-time domain to the wavenumber-frequency domain;
computing upgoing pressure wavefield based on the blended pressure wavefield and blended vertical velocity wavefield; and
transforming the upgoing pressure wavefields to obtain the space-frequency domain.

15. The medium of claim 13 wherein computing the downgoing vertical velocity wavefield comprises:
computing a direct incident downgoing vertical velocity source wavefield based on near field pressure wavefield measurements proximate the source elements of the multiple sources;
computing scattered downgoing vertical velocity source wavefield based on an incident pressure wavefield and a reflection coefficient; and
combining the direct incident downgoing vertical velocity source wavefield with the scattered downgoing vertical velocity source wavefield to obtain the downgoing vertical velocity wavefield.

16. The medium of claim 15, wherein computing the direct incident downgoing vertical velocity source wavefield comprises:
for each source of the multiple sources
computing a notional source signature for each source element of the source based on the near-field pressure wavefields of the source elements of the source;
computing a derivative of a free-space Green's functions with respect to depth; and
computing the direct incident downgoing vertical velocity wavefield based on the derivative of the free-space Green's function and the notional source signatures of the source.

17. The medium of claim 15, wherein computing the scattered downgoing vertical velocity source wavefield comprises:
for each source of the multiple sources
computing an incident pressure wavefield based on the notional source signatures of each source element;
computing a reflection coefficient based on a Kirchhoff approximation of coherent plane wave reflections from the free surface of the body of water and a Kirchhoff approximation of incoherent fluctuating scattered wavefields create by the free surface;
computing an extrapolated obliquity correction wavefield of the plane wave reflection coefficient based on the reflection coefficient; and
computing the scattered downgoing vertical velocity source wavefield based on the incident pressure wavefield and the extrapolated obliquity correction wavefield.

18. The medium of claim 13 wherein computing deblended wavefield comprises:
computing matrix elements of a correlation wavefield matrix based on the blended upgoing pressure wavefields and the downgoing vertical velocity source wavefields,
computing elements of a point spread function matrix based on the downgoing vertical velocity source wavefields; and computing a deblended wavefield matrix with attenuated source signatures and source ghosts based on the correlation wavefield matrix and the point spread function matrix.

19. Apparatus for generating an image of a subterranean formation from recorded blended pressure wavefield and recorded blended vertical velocity wavefield collected in a marine seismic survey of the subterranean formation, the apparatus comprising:
means for computing blended upgoing pressure wavefield based on the blended pressure wavefield and the blended vertical velocity wavefield;
means for computing downgoing vertical velocity wavefield based on near-field pressure wavefields generated by source elements of multiple sources activated in the marine survey;
means for computing deblended wavefield based on the blended upgoing pressure wavefield and the downgoing vertical velocity source wavefield; and
means for generating an image of the subterranean formation based at least in part on the deblended wavefield.

20. The apparatus of claim 19 wherein the means for computing the blended upgoing pressure wavefield based on the recorded blended pressure wavefield and the recorded blended vertical velocity wavefield comprises:
for each receiver location
transforms the blended pressure wavefield from the space-time domain to the wavenumber-frequency domain;
transforms the blended vertical velocity wavefield from the space-time domain to the wavenumber-frequency domain;
computes upgoing pressure wavefield based on the blended pressure wavefield and blended vertical velocity wavefield; and
transforms the upgoing pressure wavefields to obtain the space-frequency domain.

21. The apparatus of claim 19 wherein the means for computing the downgoing vertical velocity wavefield comprises:
means for computing a direct incident downgoing vertical velocity source wavefield based on near field pressure wavefield measurements proximate the source elements of the multiple sources;
means for computing scattered downgoing vertical velocity source wavefield based on an incident pressure wavefield and a reflection coefficient; and
means for combining the direct incident downgoing vertical velocity source wavefield with the scattered downgoing vertical velocity source wavefield to obtain the downgoing vertical velocity wavefield.

22. The apparatus of claim 21, wherein the means for computing the direct incident downgoing vertical velocity source wavefield comprises:
for each source of the multiple sources
computes a notional source signature for each source element of the source based on the near-field pressure wavefields of the source elements of the source;
computes a derivative of a free-space Green's functions with respect to depth; and
computes the direct incident downgoing vertical velocity wavefield based on the derivative of the free-space Green's function and the notional source signatures of the source.

23. The apparatus of claim 21, wherein the means for computing the scattered downgoing vertical velocity source wavefield comprises:

for each source of the multiple sources
computes an incident pressure wavefield based on the notional source signatures of each source element;
computes a reflection coefficient based on a Kirchhoff approximation of coherent plane wave reflections from the free surface of the body of water and a Kirchhoff approximation of incoherent fluctuating scattered wavefields create by the free surface;
computes an extrapolated obliquity correction wavefield of the plane wave reflection coefficient based on the reflection coefficient; and
computes the scattered downgoing vertical velocity source wavefield based on the incident pressure wavefield and the extrapolated obliquity correction wavefield.

24. The apparatus of claim 19 wherein the means for computing deblended wavefield comprises:
computes matrix elements of a correlation wavefield matrix based on the blended upgoing pressure wavefields and the downgoing vertical velocity source wavefields;
computes elements of a point spread function matrix based on the downgoing vertical velocity source wavefields; and
computes a deblended wavefield matrix with attenuated source signatures and source ghosts based on the correlation wavefield matrix and the point spread function matrix.

25. A method for manufacturing a geophysical data product, the method comprising:
retrieving recorded blended pressure wavefield and blended vertical velocity wavefield stored in a data-storage device, the recorded blended pressure wavefield and blended vertical velocity wavefield obtained in marine survey of a subterranean formation;
computing blended upgoing pressure wavefield based on the blended pressure wavefield and the blended vertical velocity wavefield;
computing downgoing vertical velocity wavefield based on near-field pressure wavefields generated by source elements of multiple sources activated in the marine survey;
computing deblended wavefield with attenuated source signatures and source ghosts based on the blended upgoing pressure wavefield and the downgoing vertical velocity source wavefield;
generating an image of the subterranean formation based at least in part on the deblended wavefield; and
storing the image in a non-transitory computer-readable medium.

* * * * *